United States Patent
Kim et al.

(10) Patent No.: US 9,770,865 B2
(45) Date of Patent: Sep. 26, 2017

(54) APPARATUS AND METHOD FOR FORMING THREE-DIMENSIONAL PATTERN USING ELECTROJETTING

(71) Applicant: SNU R&DB Foundation, Seoul (KR)

(72) Inventors: Ho-Young Kim, Seoul (KR); Min Hee Lee, Seoul (KR); Beom June Shin, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 344 days.

(21) Appl. No.: 14/465,839

(22) Filed: Aug. 22, 2014

(65) Prior Publication Data
US 2015/0054201 A1 Feb. 26, 2015

(30) Foreign Application Priority Data

Aug. 22, 2013 (KR) .................. 10-2013-0099563
Aug. 22, 2013 (KR) .................. 10-2013-0099564
Aug. 19, 2014 (KR) .................. 10-2014-0107651

(51) Int. Cl.
| | | |
|---|---|---|
| *D04H 1/74* | (2006.01) | |
| *B29C 67/00* | (2017.01) | |
| *B33Y 10/00* | (2015.01) | |
| *B33Y 30/00* | (2015.01) | |
| *D01D 5/00* | (2006.01) | |

(52) U.S. Cl.
CPC ...... *B29C 67/0059* (2013.01); *B29C 67/0055* (2013.01); *B29C 67/0085* (2013.01); *B33Y 10/00* (2014.12); *B33Y 30/00* (2014.12); *D01D 5/0061* (2013.01)

(58) Field of Classification Search
CPC ............ B29C 67/0059; B29C 67/0055; B29C 67/0085; D01D 5/0061; B33Y 30/00; B33Y 10/00
See application file for complete search history.

(56) References Cited

U.S. PATENT DOCUMENTS

2009/0233057 A1* 9/2009 Aksay ................. B41J 2/06
428/195.1

FOREIGN PATENT DOCUMENTS

KR   10-2010-0119630 A   11/2010

OTHER PUBLICATIONS

Bhardwaj et al., "Electrospinning: a fascinating fiber fabrication technique", Btiotechnology advances 28 (2010), p. 325-347, Jan. 2010.*
Ahmad et al., "Electrohydrodynamic Direct Writing of Biomedical Polymers and Composites", Macromolecular Materials and Engineering (2010) 295, p. 315-319.*

* cited by examiner

*Primary Examiner* — Galen Hauth
(74) *Attorney, Agent, or Firm* — The PL Law Group, PLLC

(57) ABSTRACT

An apparatus and method for forming a three-dimensional (3D) pattern using electrojetting, the apparatus including: a syringe tip having one end from which a polymer jet is discharged; a substrate that is disposed in a direction in which the polymer jet is discharged, and that forms an electric field between the substrate and the syringe tip; and a movement unit that moves the syringe tip or the substrate, wherein the polymer jet discharged from the syringe tip is moved relative to an upper side of the substrate and is stacked on the substrate.

13 Claims, 14 Drawing Sheets

260

APPARATUS AND METHOD FOR FORMING THREE-DIMENSIONAL PATTERN USING ELECTROJETTING

CROSS-REFERENCE TO RELATED APPLICATION

This application claims priority to and the benefit of Korean Patent Application No. 10-2013-0099563, filed on Aug. 22, 2013, No. 10-2013-0099564, filed on Aug. 22, 2013, and No. 10-2014-0107651, filed on Aug. 19, 2014, the disclosure of which is incorporated herein by reference in its entirety.

BACKGROUND

1. Field of the Invention

The present invention relates to an apparatus and method for forming a nanoscale three-dimensional (3D) pattern using electrojetting, and more particularly, to an apparatus and method for forming a 3D pattern using electrojetting, whereby instability inherent in electrospinning of a nanojet is overcome and the 3D pattern is capable of being stably formed.

2. Discussion of Related Art

Lithography technology that is used to fabricate various devices, such as semiconductor integrated circuits (ICs), imaging devices, or liquid crystal display (LCD) devices, is critical technology in various micro machining processes. However, the lithography technology has a complicated process and requires a high cost.

That is, the conventional lithography technology has a complicated and cumbersome process in which a mask is fabricated, a photoresist (PR) is applied onto a material and then an exposure process of transferring patterns of the mask onto the material needs to be undergone so as to form one layer for fabricating one device including a stack of a plurality of layers.

In order to reduce this inefficiency, various nano fabrication technologies have started being studied. Nano fabrication technology is technology in which a particular material can be directly deposited on an object without using a mask. Examples of nano fabrication technologies include technology using a scanning tunneling microscope (STM), technology using an atomic force microscope (AFM), and atomic layer deposition (ALD) technology.

Dip pen nanolithography (DPN) technology or inkjet printing technology has also been suggested. However, the DPN technology has an advantage in that it can realize very fine resolution but has a disadvantage of a very slow speed. The inkjet printing technology has an advantage of a fast speed but has a disadvantage that it cannot lower resolution. Thus, it is not easy to apply these technologies according to the trend of the lithography technology that has gradually become simultaneously precise and large-scale.

Thus, there is a method for forming a nanopattern using a polymer jet obtained by electrospinning as one of the newly-suggested methods. In this case, electrospinning is a technique, whereby a strong electric field is applied to a polymer droplet so that a nanoscale polymer jet can be obtained.

FIG. 1 is a view of a state in which a nanoscale polymer jet is obtained by electrospinning. As illustrated in FIG. 1, when a strong electric field is applied to a polymer droplet 1, a repulsive force is generated between molecules within a liquid due to polarization in the liquid, and a polymer jet 3 having a small thickness is discharged from an end of the polymer droplet 1.

According to the electrospinning technology, a thin fiber having a diameter less than 1 μm can be easily obtained. Thus, the electrospinning technology has been newly spotlighted in a field in which a small scale fiber is required, as in a filter, drug delivery, a material for protective clothes, or cell proliferation.

Here, in order to form a nanopattern using the electrospinning technique, the polymer jet 3 should be stably supplied and simultaneously should be placed in good order on a surface on which a pattern is formed.

However, as illustrated in FIG. 2, the polymer jet 3 discharged from a syringe 5 by electrospinning is discharged due to a self repulsive force of electric charges a) that exist on the surface of the polymer jet 3 and flies by drawing a very instable trajectory (a whipping phenomenon). As a result, the polymer jet 3 cannot be formed in good order on a surface 7 on which a pattern needs to be formed, and thus it is difficult to use electrospinning so as to form a three-dimensional (3D) nanopattern.

Meanwhile, a scheme for stacking polymers on a sharp tip, such as a needle, has been suggested, as disclosed in Patent document 1. However, there is a limitation in forming a 3D structure.

SUMMARY

The present invention is directed to an apparatus and method for forming a three-dimensional (3D) pattern using electrojetting, whereby instability inherent in electrospinning of a nanojet is overcome and the 3D pattern is capable of being stably formed.

According to an aspect of the present invention, there is provided an apparatus for forming a three-dimensional (3D) pattern using electrojetting, including: a syringe tip having one end from which a polymer jet is discharged; a substrate that is disposed in a direction in which the polymer jet is discharged, and that forms an electric field between the substrate and the syringe tip; and a movement unit that moves the syringe tip or the substrate, wherein the polymer jet discharged from the syringe tip is moved at an upper side of the substrate and is stacked on the substrate.

A distance between the syringe tip and the substrate may be greater than 0 and may be equal to or less than 200 μm.

The apparatus may further include a voltage supplier that applies a voltage having a certain polarity to the substrate so that the substrate functions with an opposite polarity to that of the syringe tip.

The voltage supplier may control a magnitude of the voltage applied to the substrate to be 0 or equal to or less than 0.2 kV so that the polymer jet is not discharged from the syringe tip.

The movement unit may vertically move the syringe tip in an opposite direction to the discharge direction or may vertically move the substrate in the discharge direction so that the polymer jet is not discharged from the syringe tip.

The movement unit may vertically move the syringe tip in an opposite direction to the discharge direction or may vertically move the substrate in the discharge direction so that a distance between the syringe tip and the polymer jet stacked on the substrate is maintained at a constant level when the polymer jet is discharged from the syringe tip.

An inner diameter of the syringe tip may be greater than 0 and may be equal to or less than 200 μm.

The apparatus may further include an electrode plate formed on the substrate, wherein the electrode plate may include a first electrode plate, a second electrode plate, and a third electrode plate which is connected to the first electrode plate and the second electrode plate, onto which the polymer jet is adhered and on which a 3D pattern is formed.

The movement unit may move the syringe tip or the substrate so that a relative movement of the syringe tip between the first electrode plate, the second electrode plate, and the third electrode plate is performed.

The third electrode plate may have a longitudinal shape or a waveform shape.

The movement unit may move the syringe tip or the substrate so that the syringe tip is moved relative to an upper side of a pattern formation portion disposed on an upper portion of the third electrode plate for the polymer jet to be adhered on.

The 3D pattern may be formed in such a way that the polymer jet discharged from the syringe tip is stacked on the pattern formation portion in the longitudinal direction as the movement unit makes a reciprocal motion of the syringe tip or the substrate in a longitudinal direction of the third electrode plate.

The discharge direction of the polymer jet and a direction in which the syringe tip or the substrate is moved, may be perpendicular to each other.

The third electrode plate may include an annular portion having a circular band shape, and 3D circular walls may be formed by the discharged polymer jet being rotated and stacked along the annular portion.

The discharged polymer jet may be rotated along an inner border of the annular portion.

The third electrode plate may further include connection portions that connect the annular portion with the first electrode plate and the second electrode plate respectively, and a width of the circular band of the annular portion may be greater than that of the connection portion.

According to another aspect of the present invention, there is provided a method for forming a three-dimensional (3D) pattern using electrojetting, including: disposing a syringe tip on an upper side of a substrate; discharging a polymer jet from the syringe tip due to an electric field between the syringe tip and the substrate; moving the syringe tip or the substrate using the movement unit; and stacking the polymer jet discharged from the syringe tip on the substrate by moving the polymer jet relative to the upper side of the substrate.

The method may further include applying a voltage having a certain polarity to the substrate by using a voltage supplier so that the substrate functions with an opposite polarity to that of the syringe tip.

The method may further include controlling a magnitude of the voltage applied to the substrate to be 0 or equal to or less than 0.2 kV by using the voltage supplier so that the polymer jet is not discharged from the syringe tip.

The method may further include vertically moving the syringe tip in an opposite direction to the discharge direction or vertically moving the substrate in the discharge direction so that the polymer jet is not discharged from the syringe tip.

The method may further include vertically moving the syringe tip in an opposite direction to the discharge direction or vertically moving the substrate in the discharge direction so that a distance between the syringe tip and the polymer jet stacked on the substrate is maintained at a constant level when the polymer jet is discharged from the syringe tip.

The stacking of the polymer jet may comprise forming a 3D pattern on an upper portion of an electrode plate formed on the substrate in such a way that the polymer jet discharged from the syringe tip is stacked on the substrate as the polymer jet makes a reciprocal motion relative to the electrode plate at an upper side of the electrode plate formed.

The stacking of the polymer jet may comprise forming 3D circular walls as the polymer jet is rotated along an annular portion formed in a form of a circular band of an electrode plate formed on the substrate and is stacked on the substrate.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Figure 1:
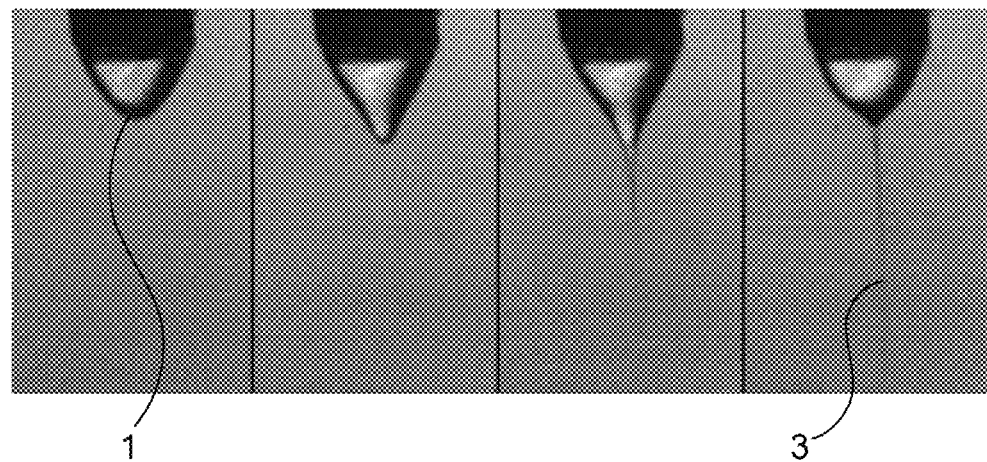
FIG. 1 is a view of a state in which a nanoscale polymer jet is obtained by electrospinning.
Figure 2:
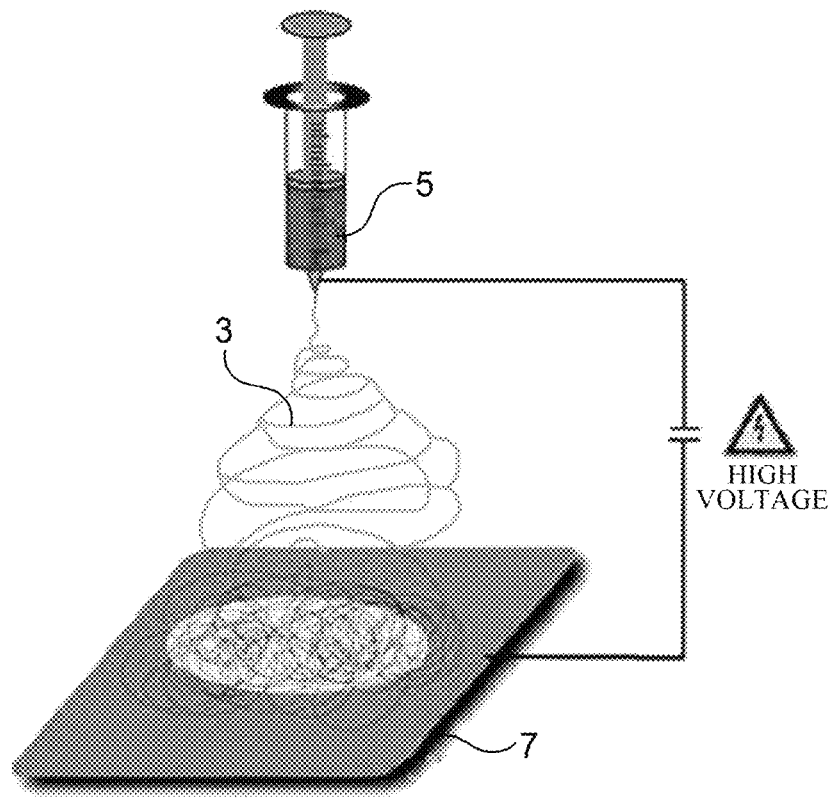
FIG. 2 is a view of a state in which an instable polymer jet is discharged by electrospinning.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

In the description of the present invention, certain detailed explanations of related art are omitted when it is deemed that they may unnecessarily obscure the essence of the invention. The following terms are defined in consideration of their functions in the present invention and may vary according to a user, an operator's intention or a practice. Therefore, definitions thereof should be made based on the contents throughout the present specification.

The technical spirit of the invention is determined by the claims, and the following embodiments are just a means for effectively describing the inventive technical spirit of the invention to one of ordinary skill in the art.

Hereinafter, detailed embodiments of the present invention will be described with reference to the drawings. However, they are just exemplary embodiments, and the present invention is not limited thereto.

Figure 3:
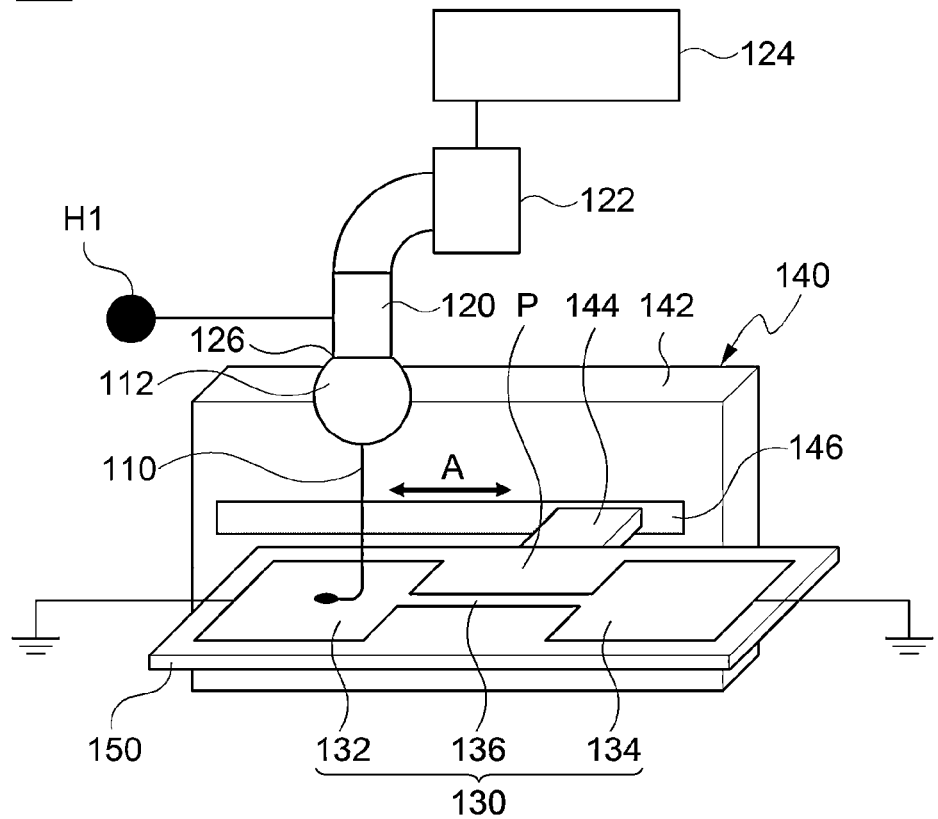
FIG. 3 is a schematic view of an apparatus for forming a three-dimensional (3D) pattern using electrojetting according to a first embodiment of the present invention.

FIG. 3 is a schematic view of an apparatus 100 for forming a three-dimensional (3D) pattern using electrojetting according to a first embodiment of the present invention. As illustrated in FIG. 3, the apparatus 100 for forming the 3D pattern using electrojetting according to the first embodiment of the present invention includes a syringe tip 120 including one end from which a polymer jet 110 is discharged, an electrode plate 130 disposed in a discharge direction of the polymer jet 110, and a movement unit 140 that may move the syringe tip 120 or the electrode plate 130.

The syringe tip 120 is a unit for discharging the polymer jet 110 from one end of the syringe tip 120. A polymer may be supplied by a pump 124 to the syringe tip 120 from a polymer reservoir 122. The polymer according to embodiments of the present invention may be one selected from the group consisting of polyethylene oxide (PEO), poly(vinylidene fluoride-hexafluoropropylene) (PVDF-HFP), polyacrylonitrile (PAN), poly(methyl methacrylate) (PMMA), polyvinyl alcohol (PVA), polystyrene (PS), polyanyiline (PANI), polyvinylidene chloride (PVDC), polybutadiene (PB), polyethylene (PE), polypropylene (PP), polyisobutylene (PIB), and ethylene propylene diene monomer (EPDM). However, the type of polymer is not limited thereto, and various polymer materials may be used, instead of the above-described polymers.

The pump 124 precisely controls flow rate or pressure in the polymer reservoir 122 so that a polymer droplet 112 may be formed on an end 126 of the syringe tip 120. Subsequently, the polymer jet 110 may be stably discharged from the polymer droplet 112 formed on the syringe tip 120 due to an electric field applied between the syringe tip 120 and the electrode plate 130. Here, the syringe tip 120 may function as an anode (+), and the electrode plate 130 may function as a cathode (−), and polymer particles of the polymer droplet 112 formed on the syringe tip 120 may have a self repulsive force due to being positive charged and simultaneously may be in good order discharged onto the electrode plate 130 due to electrical attraction with the negatively charged electrode plate 130. Here, the polymer jet 110 may be a nanopolymer jet having a nanoscale, for example.

A voltage supplier H1 may be directly connected to the syringe tip 120. Thus, the syringe tip 120 may function as the anode (+), and the electrode plate 130 may be grounded and may function as the cathode (−). A voltage supplied to the syringe tip 120 may be 1 to 3 kV, for example. However, a magnitude of the supplied voltage is not limited thereto.

An inner diameter of the syringe tip 120 may be less than 200 μm, for example, 5 to 30 μm. Thus, the nanoscale polymer jet 110 may be discharged from the syringe tip 120.

The electrode plate 130 is formed on a substrate 150, and an electric field is formed between the electrode plate 130 and the syringe tip 120 so that the polymer jet 110 may be stably discharged. The electrode plate 130 may be formed of a metal having conductivity, for example, copper (Cu) or platinum (Pt). Hereinafter, a case where the electrode plate 130 is formed of Pt, will be mainly described.

As illustrated in FIG. 3, the electrode plate 130 may include a first electrode plate 132, a second electrode plate 134, and a third electrode plate 136. The first electrode plate 132 and the second electrode plate 134 may be formed in the form of a plate, and the third electrode plate 136 may be formed in the form of a band that is connected to each of the first electrode plate 132 and the second electrode plate 134.

The first electrode plate 132 or the second electrode plate 134 is configured in such a way that, while the syringe tip 120 stays at the upper side of the first electrode plate 132 or the second electrode plate 134, the polymer jet 110 discharged from the syringe tip 120 by electrojetting may be stabilized. The third electrode plate 136 is configured in such a way that the polymer jet 110 may be stacked on an upper side of the third electrode plate 136 by making a reciprocal motion.

Here, the third electrode plate 136 may include a pattern formation portion P. The pattern formation portion P may be part of the third electrode plate 136 in a longitudinal direction. The polymer jet 110 is adhered to and stacked on the pattern formation portion P so that a 3D pattern may be formed. That is, when the syringe tip 120 makes a reciprocal motion relative to an upper side of the pattern formation portion P, the polymer jet 110 discharged from the syringe tip 120 is adhered to the pattern formation portion P and is stacked thereon so that the 3D pattern may be formed.

The first electrode plate 132 and the second electrode plate 134 perform a function of forming an electric field between the first electrode plate 132 and the second electrode plate 134 and the syringe tip 120 at a position in which the syringe tip 120 stops so that the discharged polymer jet 110 can be stabilized before or while the syringe tip 120 makes a reciprocal motion relative to the upper side of the pattern formation portion P. For example, when the syringe tip 120 is moved relative to the upper side of the electrode plate 130, the syringe tip 120 stays on the upper side of the first electrode plate 132 for a while and then is moved relative to the third electrode plate 136 after the discharged polymer jet 110 is stabilized. Then, the syringe tip 120 makes a reciprocal motion relative to the upper side of the pattern formation portion P so that the 3D pattern may be formed.

The movement unit 140 moves the syringe tip 120 or the electrode plate 130 so that the syringe tip 120 may be moved relative to the electrode plate 130. In detail, the movement unit 140 may move the syringe tip 120 or the electrode plate 130 so that the syringe tip 120 may be moved relative to the first electrode plate 132, the second electrode plate 134, and the third electrode plate 136 and the syringe tip 120 may make a reciprocal motion relative to the upper side of the pattern formation portion P. Also, the movement unit 140 may move the substrate 150. As illustrated in FIG. 3, the movement unit 140 may move either the electrode plate 130 or the syringe tip 120 so that the relative movement may be performed. Also, it is obvious that the movement unit 140 may only move the electrode plate 130 when the movement unit 140 moves the electrode plate 130. However, hereinafter, a case where the movement unit 140 moves the substrate 150 on which the electrode plate 130 is formed, will be described.

The movement unit 140 may include a body portion 142 in which a linear motor (not shown) is accommodated, and a connection portion 144 that is linked to the linear motor (not shown) and may move the substrate 150. The connection portion 144 may extend from an inside of the body portion 142 and may be coupled to the substrate 150. A guide opening 147 through which parallel movement of the connection portion 144 may be guided, may be formed in the body portion 142. Thus, as illustrated in FIG. 3, the movement unit 140 may move the substrate 150 in a horizontal direction, i.e., in the direction of arrow A (a direction that is parallel to the right and left in FIG. 3). As the substrate 150 is moved, the electrode plate 130 formed on the substrate 150 is also moved. Thus, a movement of the electrode plate 130 relative to the syringe tip 120 may be performed. Here, the relative movement includes relative movement in which the syringe tip 120 is moved from the first electrode plate 132 to the third electrode plate 136, from the third electrode plate 136 to the second electrode plate 134 or vice versa. Furthermore, the relative movement includes movement in which the syringe tip 120 makes a reciprocal motion relative to the upper side of the pattern formation portion P of the third electrode plate 136.

In the apparatus 100 for forming the 3D pattern using electrojetting according to the first embodiment of the present invention, the movement unit 140 may make a reciprocal motion of the electrode plate 130 relative to the syringe tip 120 from which the polymer jet 110 is discharged. Thus, the 3D pattern may be formed on the pattern formation portion P disposed on the third electrode plate 136.

In detail, due to the electric field formed between the syringe tip 120 and the electrode plate 130, the polymer jet 110 is discharged from the polymer droplet 112 formed on one end of the syringe tip 120. Here, since the first electrode plate 132, the third electrode plate 136, and the second electrode plate 134 are grounded in a state in which they are connected to one another, the syringe tip 120 makes a reciprocal motion relative to the upper side of the pattern formation portion P of the third electrode plate 136 so that the discharged polymer jet 110 may be stacked on the pattern formation portion P and the 3D pattern may be formed.

That is, the syringe tip 120 functions as an anode due to the voltage supplier H1, and the polymer droplet 112 is charged with positive (+) charges, and the polymer jet 110 is discharged in a state in which the polymer droplet 112 is charged with the positive (+) charges. In this case, since the electrode plate 130 is grounded and functions as a cathode, the polymer jet 110 is induced toward the electrode plate 130, i.e., is pulled and adhered to the electrode plate 130. Thus, the polymer jet 110 discharged from the syringe tip 120 may be stably pulled and adhered to the electrode plate 130.

In this case, when the electrode plate 130 makes a reciprocal motion on the pattern formation portion P due to the movement unit 140 during a state in which the syringe tip 120 is fixed, the polymer jet 110 induced onto the pattern formation portion P is stacked on the pattern formation portion P so that the 3D pattern may be formed. The pattern formation portion P may be provided as part of the third electrode plate 136 and may have a shape in which it is long in a longitudinal direction while having a predetermined width. The predetermined width may be 20 μm, for example. Here, since a distribution in electric field formed between the syringe tip 120 and the third electrode plate 136 is directed in a central direction of the third electrode plate 136, the polymer jet 110 is pulled and adhered to a center of the third electrode plate 136 in a widthwise direction, in detail, a central portion of the pattern formation portion P in the widthwise direction. Furthermore, since a polymer is charged with positive charges of a high voltage and induced charges exist in the third electrode plate 136, a large quantity of induced charges is formed in the third electrode plate 136 formed of Pt so that the polymer jet 110 may be strongly attracted to the third electrode plate 136.

Figure 4A:
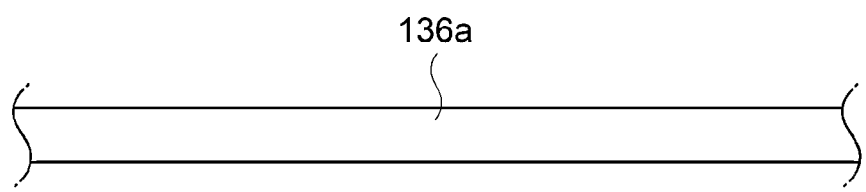
FIGS. 4A and 4B are views of a shape of a third electrode plate of the apparatus for forming the 3D pattern using electrojetting according to the first embodiment of the present invention.
Figure 4B:
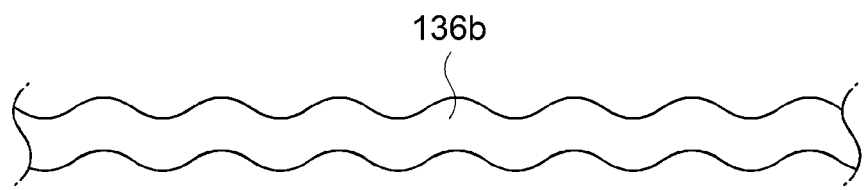
Figure 5:
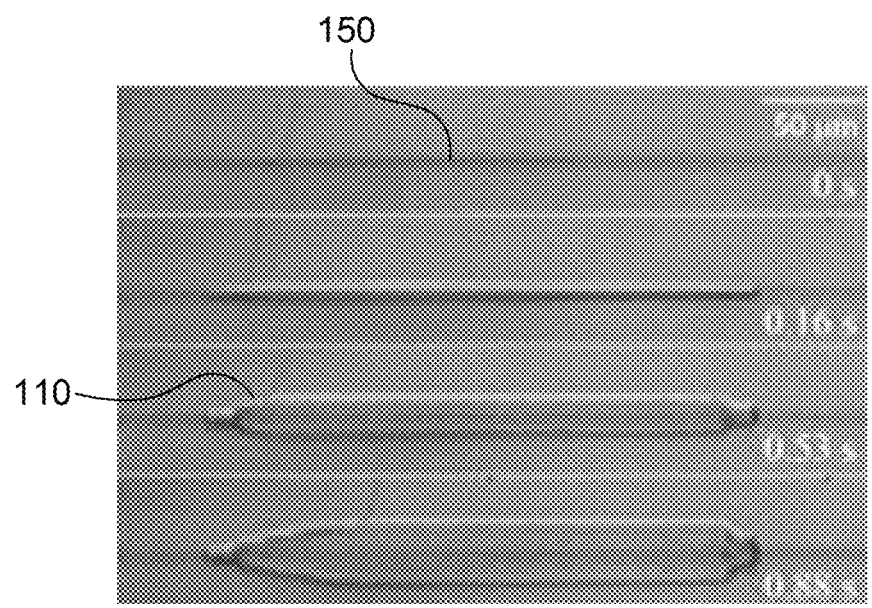
FIG. 5 is a view of a state in which the 3D pattern is stacked, using the apparatus for forming the 3D pattern using electrojetting according to the first embodiment of the present invention.

FIGS. 4A and 4B are views of a shape of the third electrode plate 136 of the apparatus 100 for forming the 3D pattern using electrojetting according to the first embodiment of the present invention, and FIG. 5 is a view of a state in which the 3D pattern is stacked, using the apparatus 100 for forming the 3D pattern using electrojetting according to the first embodiment of the present invention.

First, as illustrated in FIG. 4A, the third electrode plate 136 [at least the pattern formation portion P] may be formed in a straight line shape 136a having a predetermined width. In this case, the polymer jet 110 is also pulled toward the center of the third electrode plate 136 in the widthwise direction so as to correspond to the shape of the third electrode plate 136, and a nanowall that is a 3D pattern having a wall-like shape, such as the straight line shape 136a, may be formed on the pattern formation portion P.

A direction in which the polymer jet 110 is discharged, is a vertical direction in FIG. 3, and a direction in which the polymer jet 110 is stacked on the pattern formation portion P, is a horizontal direction in FIG. 3. Thus, the polymer jet 110 pulled toward the third electrode plate 136 is bent at 90 degrees immediately before it is stacked on the pattern formation portion P. The polymer jet 110 has directivity due to a repulsive force caused by the bending and may further advance along the pattern formation portion P.

Also, when the 3D pattern is formed, the pattern formation portion P makes a reciprocal motion relative to the syringe tip 120. Thus, after the polymer jet 110 advances to an end of the pattern formation portion P, the polymer jet 110 is rotated at 180 degrees, i.e., changes direction and passes back along the pattern formation portion P. Thus, the polymer jet 110 may be stacked on the pattern formation portion P. Furthermore, after the polymer jet 110 is stacked on the pattern formation portion P, the polymer jet 110 is electrically neutralized due to the effect of the third electrode plate 130 grounded and simultaneously opposite charges are obtained so that the polymer jet 110 to be newly stacked may be pulled. As a result, the polymer jet 110 is easily stacked on the pattern formation portion P.

Thus, as illustrated in FIG. 5, as time goes by, the polymer jet 110 may be continuously stacked in the vertical direction. For reference, FIG. 5 is a lateral view of a shape in which the polymer jet 110 is stacked, and a view of the polymer jet 110 stacked on an upper side of the substrate 150 as time goes by. An image captured at a lower side of the substrate 150 is captured from a reflected upper image.

Also, as illustrated in FIG. 4B, the third electrode plate 136 [at least the pattern formation portion P] may also be formed in a waveform shape 136b in the longitudinal direction having the predetermined width. In this case, the polymer jet 110 induced accordingly may also form a waveform nanowall. Thus, the polymer jet 110 discharged from the syringe tip 120 is stacked according to the detailed shape of the pattern formation portion P of the third electrode plate 136 so that a 3D nanopattern may be formed.

Figure 6:
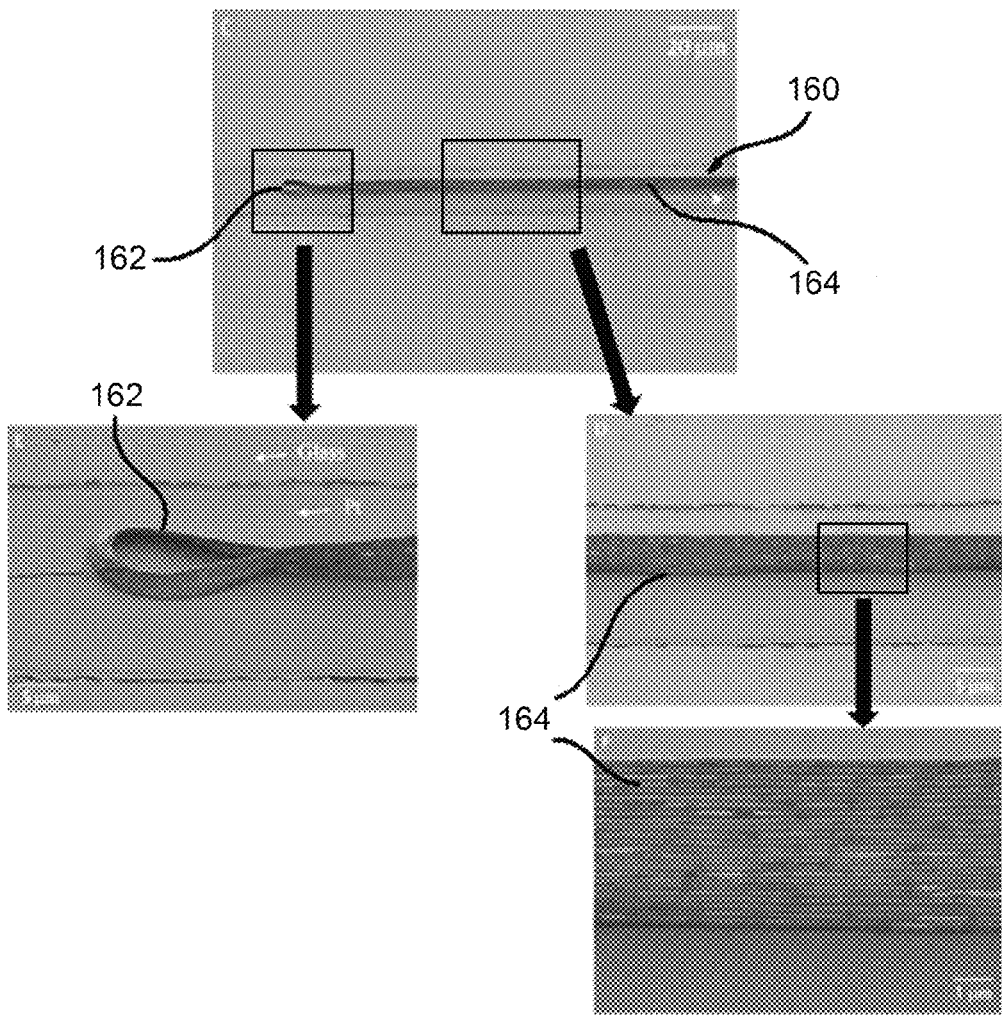
FIG. 6 is a view of an example of a 3D pattern formed by the apparatus for forming the 3D pattern using electrojetting according to the first embodiment of the present invention.

FIG. 6 is a view of an example of a 3D pattern 160 formed by the apparatus 100 for forming the 3D pattern using electrojetting according to the first embodiment of the present invention. As illustrated in FIG. 6, the stacked 3D pattern 160 includes an stacking portion 162 having an oval shape formed at both ends of the 3D pattern 160. That is, when the polymer jet 110 is stacked on the upper portion of the pattern formation portion P due to reciprocal motion, a movement direction of the polymer jet 110 is changed at both ends of the 3D pattern 160 so that the stacking portion 162 is formed during the changing procedure. The annular stacking portion 162 has a height that is about ½ of a stack height of an intermediate portion 164 of the 3D pattern 160. This is because the polymer jet 110 is not directly overlapped to be stacked on the stacking portion 162 and is divided into two parts accumulating into the oval shape of the annular stacking portion 162.

In this case, a discharging speed of the polymer jet 110 may be 10 to 50 mm/s, for example, so that the polymer jet 110 may be stably discharged and a 3D pattern may be formed. If the discharging speed of the polymer jet 110 is less than 10 mm/s, formation of the 3D pattern is delayed, and if the discharging speed of the polymer jet 110 is greater than 50 mm/s, the thickness of the polymer jet 110 is reduced, and as such, it is difficult to control the polymer jet 110.

Figure 7:
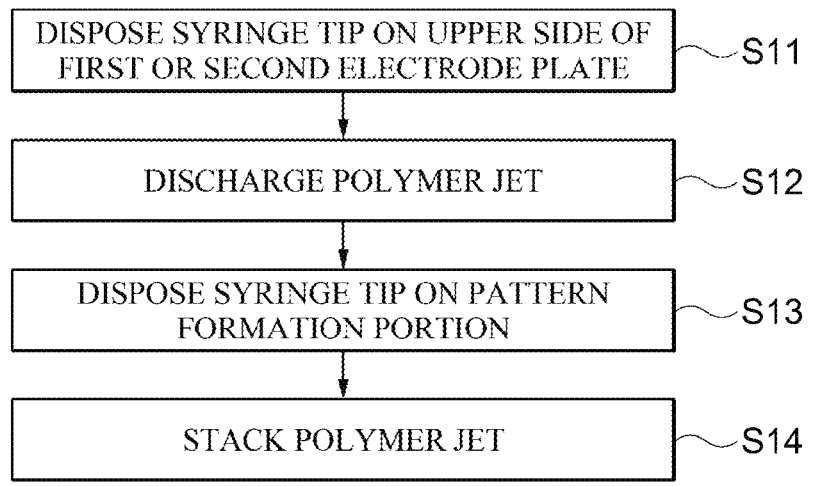
FIG. 7 is a flowchart illustrating a method for forming a 3D pattern using electrojetting according to a first embodiment of the present invention.

FIG. 7 is a flowchart illustrating a method for forming a 3D pattern using electrojetting according to a first embodiment of the present invention.

First, the syringe tip 120 is disposed on an upper side of the first electrode plate 132 or the second electrode plate 134 (Operation S11). In this state, when a high voltage, for example, a voltage of 3 to 4 kV, is applied to the syringe tip 120, electrical attraction is applied to the polymer droplet 112 of the syringe tip 120 toward the grounded first electrode plate 132 so that the polymer jet 110 may be discharged (Operation S12). Since the initially-discharged polymer jet 110 is sprayed at a high speed, for example, at a high speed of 50 mm/s or more, once the polymer jet 110 starts being discharged, the voltage applied to the syringe tip 120 is reduced, for example, to 1.2 to 1.8 kV, so that the speed of the polymer jet 110 is reduced and the polymer jet 110 is stabilized. Here, the syringe tip 120 may be fixed to and disposed on the upper side of the first electrode plate 132 or the second electrode plate 134 until discharge of the polymer jet 110 is stabilized, for example, for 1 to 2 minutes. However, a time when the syringe tip 120 is fixed to and disposed on the upper side of the first electrode plate 132 or the second electrode plate 134 is not limited to 1 to 2 minutes but may be shorter or longer than 1 to 2 minutes.

When the polymer jet 110 discharged from the syringe tip 120 is stabilized, the syringe tip 120 is disposed on the pattern formation portion P of the third electrode plate 136 connected to the first electrode plate 132 or the second electrode plate 134 (Operation S13). This may be performed by either moving the syringe tip 120 or by moving the substrate 150 on which the electrode plate 130 is formed.

Next, the syringe tip 120 makes a reciprocal motion relative to the pattern formation portion P on the upper portion of the pattern formation portion P of the third electrode plate 136. Thus, the polymer jet 110 discharged from the syringe tip 120 is stacked (Operation S14) so that a 3D pattern may be formed on the pattern formation portion P. Last, after the 3D pattern is formed, the syringe tip 120 may be moved relatively and may be disposed on the first electrode plate 132 or the second electrode plate 134.

Hereinafter, an embodiment for implementing FIGS. 3 through 7 will be described in detail.

EMBODIMENT

In the current embodiment, a glass substrate having the size of 35 mm×10 mm is used as the substrate 150. The first electrode plate 132, the second electrode plate 134, and the third electrode plate 136 are formed using a photoresist process and a sputtering process.

Here, an operation of forming the electrode plate 130 will be described in more detail. A Pt layer having a rectangular shape with the size of 10 mm×10 mm is coated on the substrate 150 so that the first electrode plate 132 and the second electrode plate 134 may be respectively formed, and a Pt wire having a width of 20 µm that connects the first electrode plate 132 and the second electrode plate 134 is formed between the first electrode plate 132 and the second electrode plate 134 so that the third electrode plate 136 may be formed. In detail, a groove having a width of 20 µm is formed using a photoresist in a portion of the first electrode plate 132 and the second electrode plate 134 at which the first electrode plate 132 and the second electrode plate 134 are connected to the third electrode plate 136, and a portion at which the third electrode plate 136 is to be formed, and the Pt wire is deposited in the groove to a thickness of about 30 to 40 nm and then the photoresist is removed using a lift-off method so that the third electrode plate 136 having the width of 20 μm may be formed on the substrate 150. A polymer solution used in the current embodiment may be poly ethylene oxide (PEO)(Mv=300,000) 5 wt %, and Picoplus, a Harvard Apparatus product is used as the pump 124.

The voltage supplied to the syringe tip 120 when the polymer jet 110 is stacked on the pattern formation portion P, is 1.2 to 1.8 kV, for example, 1.6 kV. A distance between the syringe tip 120 and the substrate 150 may be selected in various ways in consideration of the size of a 3D nanopattern to be formed and the voltage applied to the syringe tip 20 and may be 1 to 5 mm. However, in the current embodiment, the distance between the syringe tip 120 and the substrate 150 is 2 to 3 mm.

The apparatus 100 for forming the 3D pattern using electrojetting according to the first embodiment of the present invention may be used in an environment under relative humidity of 50% or less. The polymer supplied by the pump 124 may be about 5 to 10 μL/h. A discharging speed of the polymer jet 110 is 10 to 40 mm/s, and a diameter of the polymer jet 110 is 180 nm. In this case, the flow rate of the polymer jet 110 is about 2.6 nL/h. In this case, since the flow rate supplied by the pump 124 is greater than the flow rate of polymer discharged from the syringe tip 120, the size of the polymer droplet 112 at an end of the syringe tip 120 is gradually increased as time goes on. If the flow rate of polymer supplied by the pump 124 is similar to or smaller than the sum of the flow rate discharged onto the polymer jet 110 and flow rate evaporated from the polymer droplet 112, the surface of the polymer droplet 112 is dried and the viscosity thereof is increased as time goes by. Thus, the polymer is not discharged onto the polymer jet 110 but is solidified or is discharged in a multi jet manner so that the apparatus 100 may not normally operate. Also, when the flow rate of polymer supplied by the pump 124 is greater than 10 nL/h, the size of the polymer droplet 112 is increased at a high speed. Thus, if the quantity of moisture on the surface of the polymer droplet 112 is increased and viscosity of the polymer droplet 112 is lowered, the speed of the sprayed jet is relatively large, 50 mm/s or more so that the thickness of the polymer jet 110 is reduced and it may be difficult to control the polymer jet 110.

In the current embodiment, an interval at which the movement unit 140 makes a reciprocal motion on the substrate 150, was 1 mm, a total of 50 times. A speed at which the substrate 150 makes a reciprocal motion (is moved) by the movement unit 140, is substantially the same as the discharging speed of polymer jet 110. If the speed of the polymer jet 110 is greater than that of the speed of the substrate 150, the polymer jet 110 is moved faster than the substrate 150 in the horizontal direction so that a direction-changing time of the polymer jet 110 is quickened and it is difficult to normally form the 3D pattern. If the speed of the polymer jet 110 is smaller than the speed of the substrate 150, the polymer jet 110 is pulled and stretches and thus it is difficult to normally form the 3D pattern.

Figure 8:
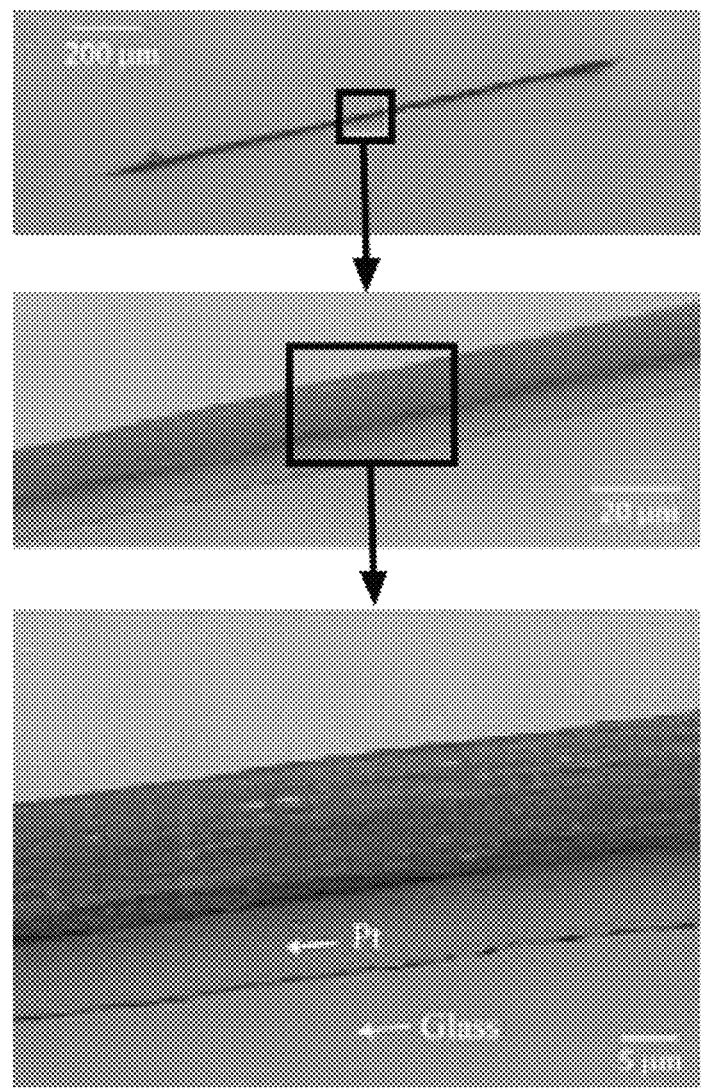
FIG. 8 is a view of another example of a 3D pattern formed by the apparatus for forming the 3D pattern using electrojetting according to the first embodiment of the present invention.

The 3D pattern formed according to the current embodiment will be described with reference to FIG. 8.

Figure 9:
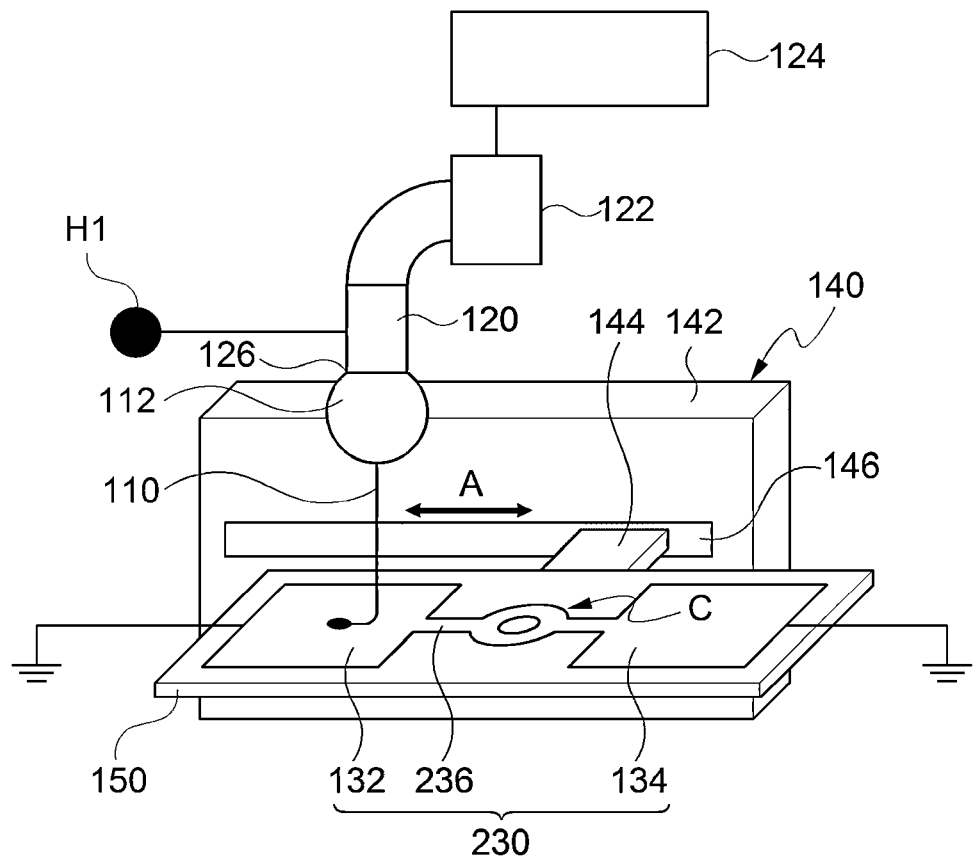
FIG. 9 is a schematic view of an apparatus for forming a 3D pattern using electrojetting according to a second embodiment of the present invention.

FIG. 9 is a schematic view of an apparatus 200 for forming a 3D pattern using electrojetting according to a second embodiment of the present invention. As illustrated in FIG. 9, the apparatus 200 for forming the 3D pattern using electrojetting according to the second embodiment of the present invention includes a syringe tip 120 having one end from which a polymer jet 110 is discharged, an electrode plate 230 disposed in a discharge direction of the polymer jet 110, and a movement unit 140 that may move the syringe tip 120 or the electrode plate 230. There is only a difference between the apparatus 200 for forming the 3D pattern using electrojetting according to the second embodiment of the present invention and the apparatus 100 for forming the 3D pattern using electrojetting according to the first embodiment of the present invention in the shape of an electrode plate 230, in particular, the shape of a third electrode plate 236. The other elements of the apparatus 200 for forming the 3D pattern using electrojetting according to the second embodiment of the present invention are substantially the same as those of the apparatus 100 described above. The same reference numerals as those of FIGS. 3 through 8 are used for the above-described elements, as illustrated in FIG. 9, and hereinafter, a detailed description thereof will be omitted.

The electrode plate 230 of the apparatus 200 for forming the 3D pattern using electrojetting according to the second embodiment of the present invention may include a first electrode plate 132, a second electrode plate 134, and the third electrode plate 236. The first electrode plate 132 and the second electrode plate 134 may be formed in the form of a plate, and the third electrode plate 236 may be formed in the form of a band that is connected to each of the first electrode plate 132 and the second electrode plate 134 and may include a annular portion C formed in the form of a circular band.

The annular portion C of the third electrode plate 236 causes the polymer jet 110 to be rotated along the annular portion C due to an electric field formed between the syringe tip 120 and the annular portion C and to be stacked. In detail, when the polymer jet 110 is discharged in a state in which the syringe tip 120 is disposed on an upper side of the annular portion C, the polymer jet 110 is induced toward the annular portion C and is adhered thereto so that 3D circular walls (or 3D nano circular walls) may be formed. That is, the polymer jet 110 may be stacked on an upper portion of the annular portion C.

The first electrode plate 132 and the second electrode plate 134 perform a function of forming an electric field between the syringe tip 120 and the annular portion C at a position in which the syringe tip 120 stops so that the polymer jet 110 to be discharged may be stabilized before the syringe tip 120 is moved relative to the upper side of the annular portion C. For example, when the syringe tip 120 is moved relative to the upper side of the electrode plate 230, the syringe tip 120 stays on the upper side of the first electrode plate 132 for a while and then is moved relative to the annular portion C of the third electrode plate 236 after the discharged polymer jet 110 is stabilized. Then, the polymer jet 110 is discharged onto the upper side of the annular portion C so that the 3D circular walls may be formed.

As described above, the movement unit 140 moves the syringe tip 120 or the electrode plate 230 so that a movement of the syringe tip 20 relative to the electrode plate 230 may be performed. In detail, the movement unit 140 may move the syringe tip 120 or the electrode plate 230 so that the syringe tip 120 may be moved relative to the first electrode plate 132, the second electrode plate 134, and the third electrode plate 236. As illustrated in FIG. 9, the movement unit 140 may move the substrate 150 in a horizontal direction, i.e., in the direction of arrow A (a direction that is parallel to the right and left in FIG. 9). As the substrate 150 is moved, the electrode plate 230 formed on the substrate 150 is also moved. Thus, a movement of the electrode plate 230 relative to the syringe tip 120 may be performed.

In the apparatus 200 for forming the 3D pattern using electrojetting according to the second embodiment of the present invention, the movement unit 140 causes the syringe tip 120 from which the polymer jet 110 is discharged, to be moved relative to the upper side of the annular portion C so that the 3D circular walls may be formed on the annular portion C disposed on the third electrode plate 236.

In detail, due to the electric field formed between the syringe tip 120 and the electrode plate 230, the polymer jet 110 may be discharged from the polymer droplet 112 formed on one end of the syringe tip 120. Here, since the first electrode plate 132, the third electrode plate 236, and the second electrode plate 134 are grounded while being connected to one another, the polymer jet 110 discharged from the syringe tip 120 is induced toward the annular portion C and simultaneously stacked along the annular portion C so that the 3D circular walls may be formed.

Figure 10:
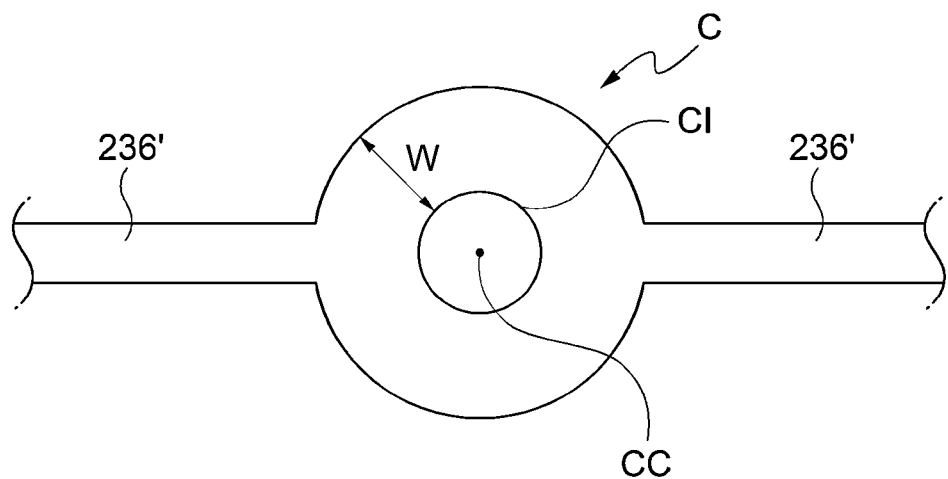
FIG. 10 is a view of a shape of a third electrode plate of the apparatus for forming the 3D pattern using electrojetting according to the second embodiment of the present invention.

FIG. 10 is a view of a shape of the third electrode plate 236 of the apparatus 200 for forming the 3D pattern using electrojetting according to the second embodiment of the present invention. As illustrated in FIG. 10, the annular portion C that is part of the third electrode plate 236 may be included in the third electrode plate 236 and has a shape of a circular band having a predetermined width W. The predetermined width W may be 100 µm, for example, and an inner diameter of an inner border CI may be 200 µm.

Here, since a distribution in an electric field formed between the syringe tip 120 and the annular portion C is directed in a direction of the inner border CI of the annular portion C formed of Pt that is metal, the polymer jet 110 may be adhered to the inner border CI of the annular portion C. Furthermore, since a polymer is charged with positive charges of a high voltage, when the syringe tip 120 discharges the polymer jet 110 onto the upper side of the annular portion C, and induced charges exist in the annular portion C, a larger quantity of induced charges is generated in the annular portion C formed of Pt than that generated in the substrate 150 formed of glass so that the polymer jet 110 may be strongly attracted to the annular portion C.

As illustrated in FIG. 10, the width W of the annular portion C having the circular band shape may be greater than a width of a connection portion 236' for connecting the annular portion C and each of the first electrode plate 132 and the second electrode plate 134. When the width W of the annular portion C is equal to or less than the width of the connection portion 236', the polymer jet 110 discharged from the syringe tip 20 at the upper side of the annular portion C, may be unstably rotated and may not be stacked on the inner border CI of the annular portion C but may be deflected onto a point where the annular portion C and the connection portion 236' meet each other. This is because the polymer jet 110 is charged with positive charges, negative charges for neutralizing the adhered polymer jet 110 come into the polymer jet 110 via the connection portion 236', neutralization of the positive charges is quickly performed at the point where the annular portion C and the connection portion 236' meet each other, and the negative charges to newly come are concentrated on the point where the annular portion C and the connection portion 236' meet each other. However, when the width W of the annular portion C having the circular band shape is greater than the width of the connection portion 236', a distance between the annular portion C on which the polymer jet 110 is stacked, and the point where the annular portion C and the connection portion 236' meet each other is increased, and a deflection phenomenon of the polymer jet 110 is reduced.

Also, a diameter of the inner border CI is also 200 µm which is greater than the width W of the annular portion C or the width of the connection portion 236' so that the effect of accumulation of the positive charges due to the polymer jet 110 may be minimized.

A direction in which the polymer jet 110 is discharged, is a vertical direction in FIG. 9, whereas the polymer jet 110 is stacked on the annular portion C in a circumferential direction of the annular portion C in FIG. 9. Thus, the polymer jet 110 pulled toward the third electrode plate 236 is bent at 90 degrees immediately before the polymer jet 110 is stacked on the annular portion C, and due to a repulsive force caused by bending, the polymer jet 110 has directivity and may be further rotated along the annular portion C.

In this case, the discharging speed of the polymer jet 110 may be, for example, 10 to 50 mm/s so that the polymer jet 110 may be stably discharged and the 3D circular walls may be formed. When the discharging speed of the polymer jet 110 is less than 10 mm/s, formation of the 3D circular walls is delayed, and when the discharging speed of the polymer jet 110 is equal to or greater than 50 mm/s, the thickness of the polymer jet 110 is decreased, and as such, it becomes difficult to control the polymer jet 110.

Figure 11:
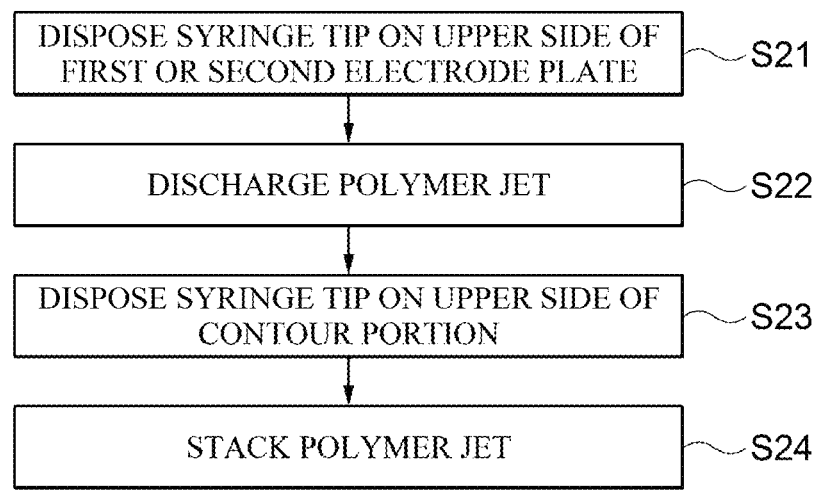
FIG. 11 is a flowchart illustrating a method for forming a 3D pattern using electrojetting according to a second embodiment of the present invention.

FIG. 11 is a flowchart illustrating a method for forming a 3D pattern using electrojetting according to a second embodiment of the present invention.

First, the syringe tip 120 is disposed on an upper side of the first electrode plate 132 or the second electrode plate 134 (Operation S21). In this state, when a high voltage, for example, a voltage of 3 to 4 kV is applied to the syringe tip 120, an electric attraction is applied to the polymer droplet 112 of the syringe tip 120 toward the grounded first electrode plate 132 so that the polymer jet 110 may be discharged (Operation S22). Since the initially-discharged polymer jet 110 is discharged at a high speed, for example, at a speed of 50 mm/s, once the polymer jet 110 starts being discharged and the voltage applied to the syringe tip 120 is reduced to, for example, 1.2 to 1.8 kV, the polymer jet 110 is stabilized while the speed of the polymer jet 110 is reduced.

If the polymer jet 110 discharged from the syringe tip 120 is stabilized, the syringe tip 120 is disposed on the upper side of the annular portion C of the third electrode plate 236 connected to the first electrode plate 132 or the second electrode plate 134 (Operation S23). This may be achieved by either moving the syringe tip 120 or by moving the substrate 50 on which the electrode plate 30 is formed.

Next, if the polymer jet 110 is continuously discharged onto the upper side of the annular portion C of the third electrode plate 236, the discharged polymer jet 110 is rotated along the inner border CI of the annular portion C and is stacked (Operation S24) so that 3D circular walls may be formed on the upper portion of the annular portion C. Last, after the 3D circular walls are formed, the syringe tip 120 may be moved relative to the first electrode plate 132 or the second electrode plate 134 and thus may be disposed thereon.

The embodiment for implementing FIGS. 9 through 11 is the same as the previous * embodiment for implementing FIGS. 3 through 7 except for the operation of forming the annular portion C of the third electrode plate 236. In connection with the operation of forming the annular portion C, a groove having a width of 20 µm is formed using a photoresist in a portion of the first electrode plate 132 and the second electrode plate 134 at which the first electrode plate 132 and the second electrode plate 134 are connected to the third electrode plate 236, and a portion at which the third electrode plate 236 is to be formed, and a Pt wire is deposited in the groove to a thickness of about 30 to 40 nm and then the photoresist is removed using a lift-off method so that the third electrode plate 236 including the connection portion 236' having the width of 20 μm and the annular portion C having the width of 100 μm may be formed on the substrate 150.

Figure 12:
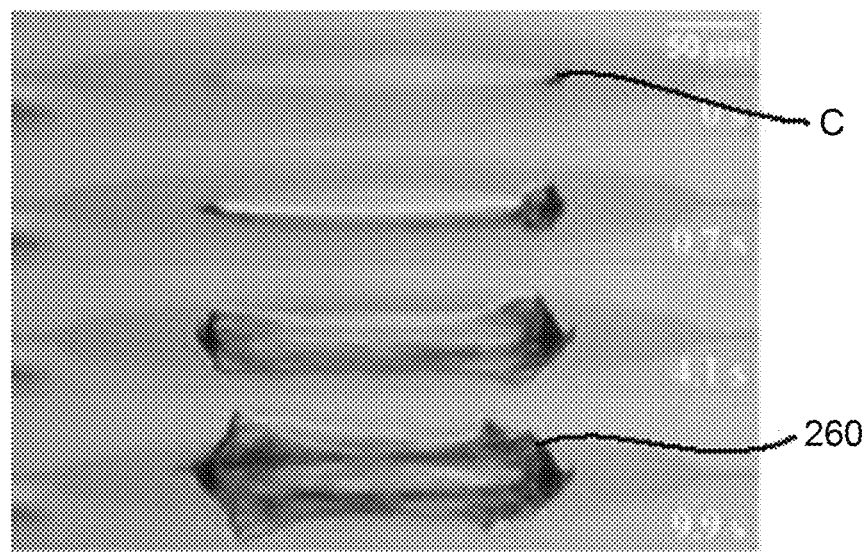
FIG. 12 is a view of an example of a 3D pattern formed by the apparatus for forming the 3D pattern using electrojetting according to the second embodiment of the present invention.
Figure 13:
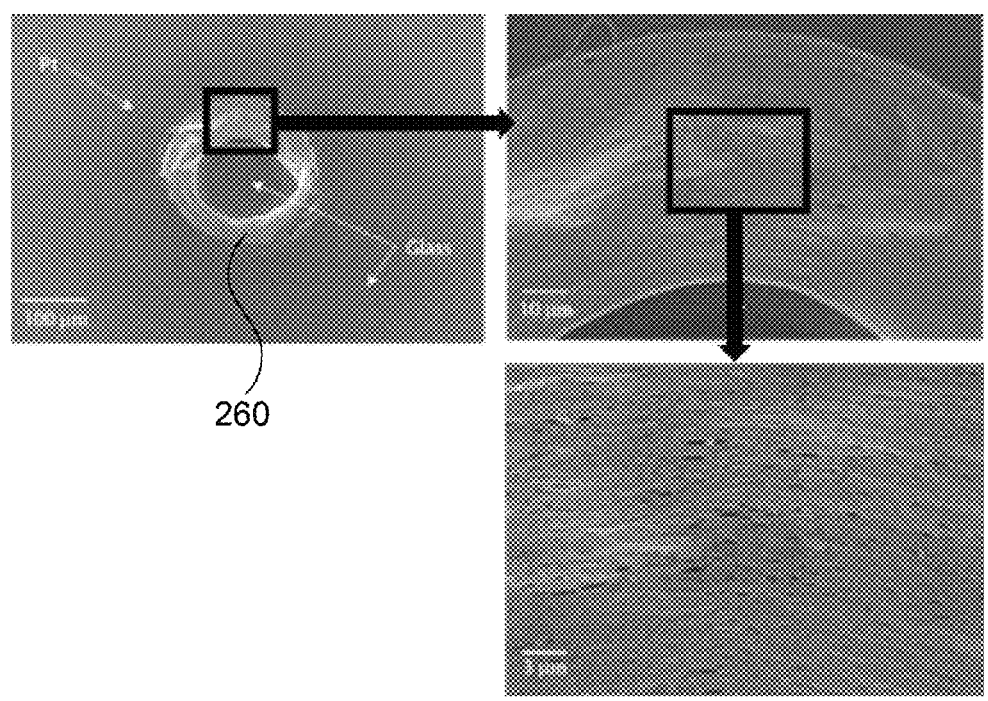
FIG. 13 is a view of another example of a 3D pattern formed by the apparatus for forming the 3D pattern using electrojetting according to the second embodiment of the present invention.

According to the current embodiment, 3D circular walls 260 on which the polymer jet 110 is rotated along the inner border CI of the annular portion C and is stacked, are illustrated over time, as illustrated in FIG. 12, and the 3D circular walls 260 formed by performing the rotation of 350 times, are illustrated in FIG. 13. For reference, the structure of a lower side of the annular portion C in FIG. 12 is an image in which the 3D circular walls formed on the upper side of the annular portion C are reflected on the substrate 150.

Figure 14:
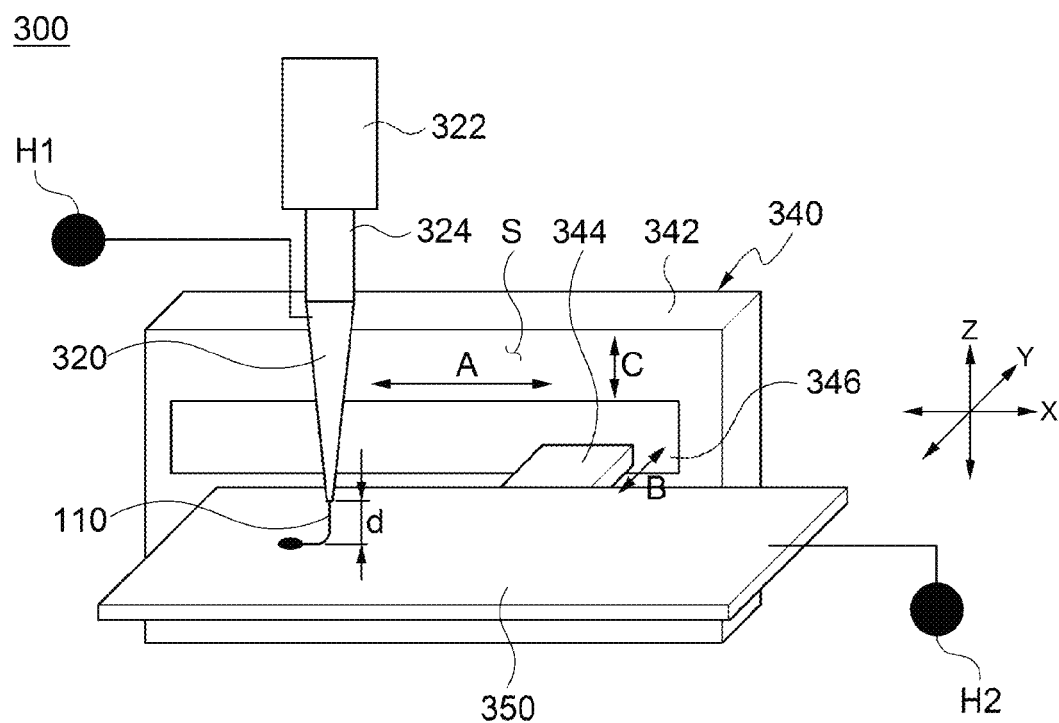
FIG. 14 is a schematic view of an apparatus for forming a 3D pattern using electrojetting according to a third embodiment of the present invention.

FIG. 14 is a schematic view of an apparatus for forming a 3D pattern using electrojetting according to a third embodiment of the present invention. As illustrated in FIG. 14, an apparatus 300 for forming a 3D pattern using electrojetting according to the third embodiment of the present invention includes a syringe tip 320 from which a polymer jet 110 is discharged, a substrate 350 disposed in a direction in which the polymer jet 110 is discharged, and a movement unit 340 that may move the syringe tip 320 or the substrate 350.

The syringe tip 320 is a unit having one end from which the polymer jet 110 is discharged. A polymer may be supplied to the syringe tip 320 from a polymer reservoir 322 via a connection tube 324. The syringe tip 320 may be disposed at a point where a distance d between the syringe tip 320 and the substrate 350 is equal to or less than 200 μm. Thus, due to an electric field applied between the syringe tip 320 and the substrate 350, the polymer jet 110 in the connection tube 324 is pulled toward the substrate 350 and is discharged via the syringe tip 320. In this case, an additional pump (not shown) is not necessary. Also, as described above, it is obvious that the pump (not shown) precisely controls flow rate or pressure in the polymer reservoir 322 and may push a polymer solution in the polymer reservoir 322 toward an end of the syringe tip 320.

A voltage supplier H1 may be directly connected to the syringe tip 320. Thus, the syringe tip 320 may function as an anode (+), and the substrate 350 may function as a cathode (−).

The syringe tip 320 may be formed of glass and may be a glass pipette, for example. When the syringe tip 320 is formed of a nonmetallic material, an outer surface of the syringe tip 320 may be coated with a metal layer, for example, a Pt layer. If the outer surface of the syringe tip 320 is coated with the metal layer, a voltage applied by the voltage supplier H1 via the syringe tip 320 may be 0.5 kV, for example. Also, when the outer surface of the syringe tip 320 is not coated with the metal layer, the voltage applied by the voltage supplier H1 via the syringe tip 320 may be 1 to 3 kV, for example. That is, when the outer surface of the syringe tip 320 is coated with the metal layer, a low voltage less than 0.5 kV may be used.

However, as will be described below, a voltage having a certain polarity may be applied by a voltage supplier H2 to the substrate 350 so that the substrate 350 may function with an opposite polarity to that of the syringe tip 320. In this case, even though no voltage is applied to the syringe tip 320, the polymer jet 110 may be discharged from the syringe tip 320. That is, since the distance d between the syringe tip 320 and the substrate 350 is equal to or less than 200 μm (or a short distance between 10 to 50 μm), when a negative (−) voltage is applied to the substrate 350, a positive (+) voltage of less than about 0.05 kV is induced in the syringe tip 320 so that an electric field may be formed between the syringe tip 320 and the substrate 350. In this case, the syringe tip 320 may function as an anode (+), and the substrate 350 may function as a cathode (−). Polymer particles in the syringe tip 320 have a self repulsive force and simultaneously may be discharged in good order onto the substrate 350 due to an electrical attraction with negative charges charged in the substrate 350. Thus, in this case, the voltage supplier H1 may be omitted.

An inner diameter of the syringe tip 320 may be equal to or less than 200 μm, for example, 5 to 30 μm. Thus, the nanoscale polymer jet 110 may be discharged from the syringe tip 320. However, the inner diameter of the syringe tip 320 is not limited thereto and may vary according to viscosity of the polymer solution, a solute, or the type of a solvent.

An electric field is formed between the substrate 350 and the syringe tip 320. The substrate 350 may be disposed in the discharge direction of the polymer jet 110 so that the distance d between the substrate 350 and the syringe tip 320 may be equal to or less than 200 μm. For example, the distance d between the syringe tip 320 and the substrate 350 may be 10 to 50 μm.

A glass substrate having the size of 35 mm×10 mm, for example, may be used as the substrate 350. Unlike the apparatuses 100 and 200 for forming the 3D pattern using electrojetting according to the first embodiment and the second embodiment of the present invention, the substrate 350 does not need to be coated with a metal wire. As described above, since the distance d between the syringe tip 320 and the substrate 350 is about 10 to 50 μm, the electric field generated from the syringe tip 320 may be concentrated perpendicular to the substrate 350. Thus, the polymer jet 110 discharged from the syringe tip 320 may be pulled toward the substrate 350 and may be adhered onto the substrate 350. However, as described above, it is obvious that the metal wire, for example, a Pt wire, may be stacked on the substrate 350 so as to form an electrode plate and the polymer jet 110 may be induced onto the electrode plate.

A voltage supplier H2 may be directly connected to the substrate 350. Thus, the substrate 350 may function as a cathode (−), and the syringe tip 320 may function as an anode (+). If the substrate 350 is formed of a nonmetallic material, the voltage supplier H2 may apply a voltage less than 0.5 kV, for example, to the substrate 350. Also, when the substrate 350 is formed of a metallic material (or when the substrate 350 is coated with the metal wire), the voltage supplier H2 may apply a voltage less than 0.3 kV, for example, to the substrate 350 (or the metal wire coated on the substrate 350). When a voltage having an opposite polarity to that of the syringe tip 320 is applied to the substrate 350, an electric field is formed between the syringe tip 320 and the substrate 350, and the polymer jet 110 in the connection tube 324 may be pulled toward the substrate 350 and may be discharged via the syringe tip 320. The polymer jet 110 discharged from the syringe tip 320 may be adhered onto the substrate 350 so that the 3D pattern may be formed.

Here, the voltage supplier H2 applies a negative (−) voltage to the substrate 350. However, the voltage supplier H2 may also apply a positive (+) voltage to the substrate 350. In this case, the substrate 350 may function as an anode (+), and the syringe tip 320 may function as a cathode (−).

Furthermore, the voltage supplier H2 may control the magnitude of the voltage applied to the substrate 350 to be 0 or equal to or less than 0.2 kV so that the polymer jet 110 may not be discharged from the syringe tip 320. That is, when the syringe tip 320 is moved from a current position to another position so as to adjust a stack position of the polymer jet 110, the voltage supplier H2 controls the magnitude of the voltage applied to the substrate 350 to be 0 or equal to or less than 0.2 kV so that the polymer jet 110 may not be discharged from the syringe tip 320.

Also, the substrate 350 may be connected to a ground electrode (not shown). In this case, the substrate 350 may be grounded and may function as a cathode (−), and the syringe tip 320 may function as an anode (+).

The movement unit 340 may move the syringe tip 320 or the substrate 350 in a horizontal direction (X-axis or Y-axis movement) so that the 3D pattern may be formed on the substrate 350. The movement unit 340 may move the syringe tip 320 or the substrate 350 in a vertical direction (Z-axis movement) so that, when the 3D pattern is formed, a distance between the syringe tip 320 and the polymer jet 110 stacked on the substrate 350 may be maintained at a constant level or the polymer jet 110 may not be discharged from the syringe tip 320 so as to adjust the stack position of the polymer jet 110. Hereinafter, a case where the movement unit 340 moves the substrate 350 so that the above effects may be achieved, will be described in detail. However, it is obvious that the movement unit 340 moving the syringe tip 320 may achieve these effects.

The movement unit 340 may include a body portion 342 in which a linear motor (not shown) is accommodated, and a connection portion 344 that is linked to the linear motor and may move the substrate 350. The connection portion 344 may extend from an inside of the body portion 342 and may be coupled to the substrate 350. A guide opening 346 that may guide a horizontal movement and a vertical movement of the connection portion 344 may be formed in the body portion 342.

Thus, as illustrated in FIG. 14, the movement unit 340 may move the substrate 350 in a longitudinal direction of the body portion 342, i.e., in the direction of arrow A (X-axis movement). Also, the movement unit 340 may move the substrate 350 in a direction perpendicular to one plane S of the body portion 342, i.e., in the direction of arrow B (Y-axis movement). Furthermore, the movement unit 340 may move the substrate 350 in the discharge direction of the polymer jet 110 or in an opposite direction to the discharge direction of the polymer jet 110, i.e., in the direction of arrow C (Z-axis movement). That is, the movement unit 340 may freely move the substrate 350 in a 3D space. By controlling the movement unit 340, the substrate 350 may be moved in the X-axis, the Y-axis, or Z-axis direction. That is, according to the embodiments of the present invention, the substrate 350 may be freely moved by the movement unit 340 so that the 3D pattern may be formed in a desired region.

Also, the movement unit 340 may vertically move the substrate 350 in the discharge direction of the polymer jet 110 so that the polymer jet 110 may not be discharged from the syringe tip 320 when the stack position of the polymer jet 110 is adjusted. That is, when the syringe tip 320 is moved from a current position to another position so as to adjust the stack position of the polymer jet 110, the substrate 350 may be vertically moved in the discharge direction (direction C) of the polymer jet 110 so that the distance d between the syringe tip 320 and the substrate 350 may be increased. For example, the movement unit 340 may vertically move the substrate 350 in the discharge direction of the polymer jet 110 so that the distance d between the syringe tip 320 and the substrate 350 may be equal to or greater than 5 mm. In this case, the electric field between the syringe tip 320 and the substrate 350 may be weakened or may disappear so that the polymer jet 110 may not be discharged from the syringe tip 320. Also, the movement unit 340 may vertically move the syringe tip 320 in an opposite direction to the discharge direction of the polymer jet 110 so that the distance d between the syringe tip 320 and the substrate 350 may be increased. That is, according to the embodiments of the present invention, the distance d between the syringe tip 320 and the substrate 350 is increased by the movement unit 340 so that the polymer jet 110 may not be discharged from the syringe tip 320 and the 3D pattern may be easily formed in the desired region.

Furthermore, the movement unit 340 may vertically move the substrate 350 in the discharge direction of the polymer jet 110 so that the distance between the syringe tip 320 and the polymer jet 110 stacked on the substrate 350 may be maintained at a constant level when the polymer jet 110 is discharged from the syringe tip 320. As a larger quantity of the polymer jet 110 is stacked on the substrate 350 when the polymer jet 110 is discharged from the syringe tip 320, the distance between the syringe tip 320 and the stacked polymer jet 110, i.e., the 3D pattern, may be reduced. Thus, the movement unit 340 vertically moves the substrate 350 in the discharge direction of the polymer jet 110 whenever the polymer jet 110 is stacked on the substrate 350 so that the distance between the syringe tip 320 and the polymer jet 110 stacked on the substrate 350 may be maintained at a constant level. Also, the movement unit 340 vertically moves the syringe tip 320 in an opposite direction to the discharge direction of the polymer jet 110 so that the distance between the syringe tip 320 and the polymer jet 110 stacked on the substrate 350 may be maintained at a constant level. That is, according to the embodiments of the present invention, the distance between the syringe tip 320 and the polymer jet 110 stacked on the substrate 350 is maintained by the movement unit 340 at a constant level when the polymer jet 110 is discharged from the syringe tip 320 so that a desired 3D pattern may be more precisely formed.

In the apparatuses 100 and 200 for forming the 3D pattern using electrojetting according to the first embodiment and the second embodiment of the present invention, a speed at which the substrate 150 is moved to make a reciprocal motion (or a movement) by the movement unit 140, is the same as a speed at which the polymer jet 110 is discharged. However, since here, the distance between the syringe tip 320 and the substrate 350 is just about 10 to 50 μm and the polymer jet 110 discharged from the syringe tip 320 is pulled toward the substrate 350, the speed at which the polymer jet 110 is discharged and the movement speed of the substrate 350 do not need to be the same. That is, according to the embodiments of the present invention, the polymer jet 110 may be discharged at a desired speed regardless of the movement speed of the substrate 350. However, the embodiments of the present invention are not limited thereto, and it is obvious that, as described above, the speed at which the polymer jet 110 is discharged and the movement speed of the substrate 350 may be the same.

Figure 15:
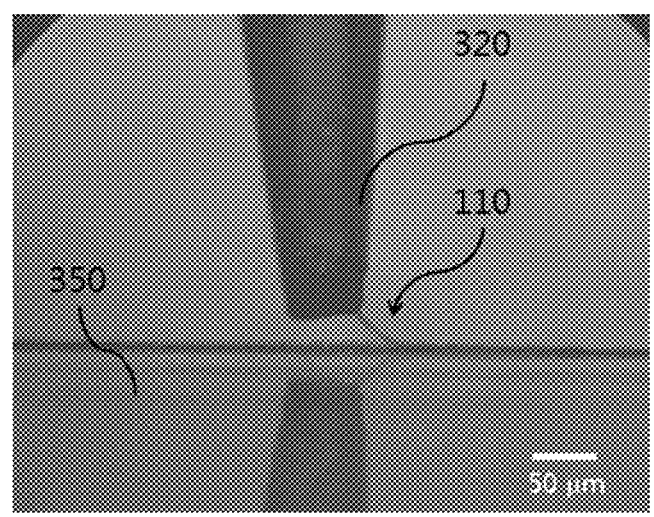
FIG. 15 is a view of a case where a distance between a syringe tip and a substrate is 30 µm, in the apparatus for forming the 3D pattern using electrojetting according to the third embodiment of the present invention.
Figure 16:
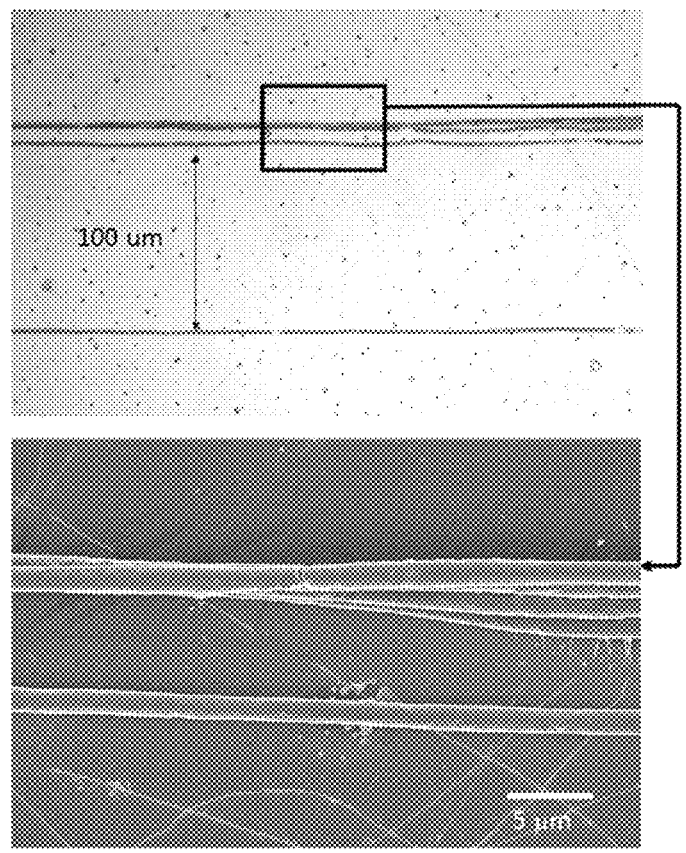
FIG. 16 is a view of an example of a 3D pattern formed by the apparatus for forming the 3D pattern using electrojetting according to the third embodiment of the present invention, in FIG. 15.

FIG. 15 is a view of a case where the distance d between the syringe tip 320 and the substrate 350 is 30 μm, in the apparatus 300 for forming the 3D pattern using electrojetting according to the third embodiment of the present invention, and FIG. 16 is a view of an example of a 3D pattern formed by the apparatus 300 for forming the 3D pattern using electrojetting according to the third embodiment of the present invention, in FIG. 15. As illustrated in FIG. 16, the 3D pattern is stacked on the substrate 350 in a three-dimensional manner. According to the embodiments of the present invention, the distance d between the syringe tip 320 and the substrate 350 may be adjusted to 30 µm using the movement unit 340. In this case, the polymer jet 110 may be sprayed from the syringe tip 320 and may be stacked on the substrate 350. The 3D pattern may be formed from the polymer jet 110 stacked on the substrate 350. An interval at which the 3D pattern is stacked, may be 100 nm, for example.

Figure 17:
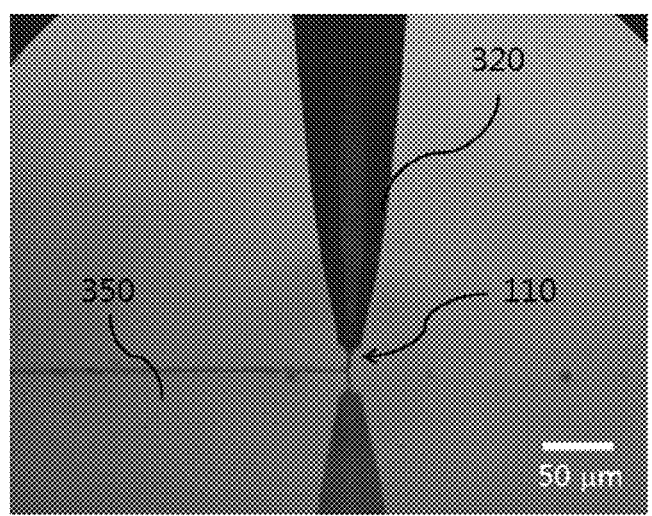
FIG. 17 is a view of a case where a distance between the syringe tip and the substrate is 10 μm, in the apparatus for forming the 3D pattern using electrojetting according to the third embodiment of the present invention.
Figure 18A:
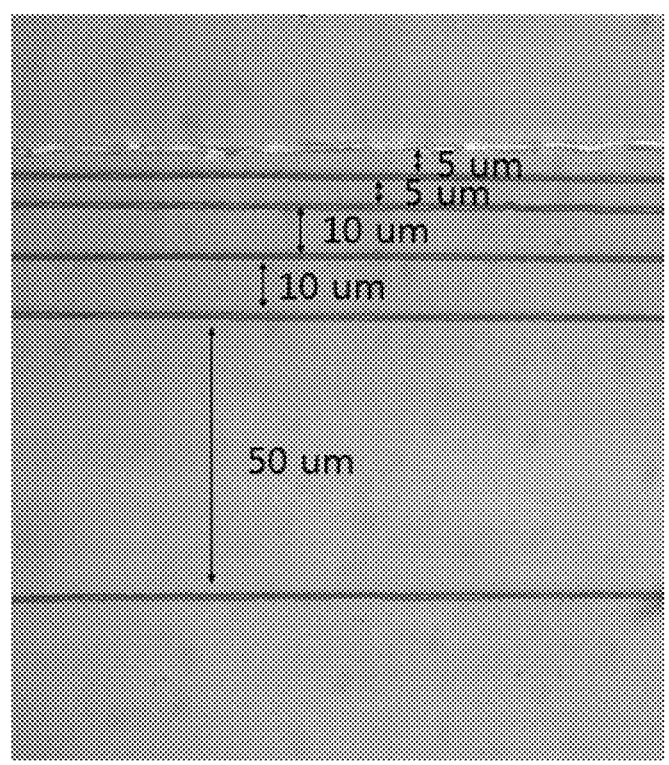
FIGS. 18A and 18B are views of an example of a 3D pattern formed by the apparatus for forming the 3D pattern using electrojetting according to the third embodiment of the present invention, in FIG. 17.
Figure 18B:
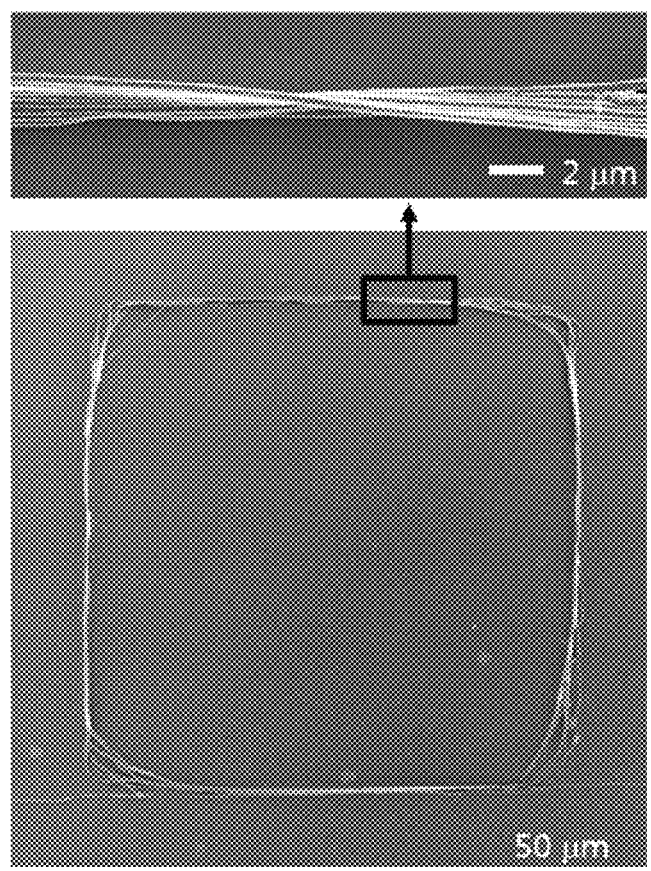

FIG. 17 is a view of a case where the distance d between the syringe tip 320 and the substrate 350 is 10 µm, in the apparatus 300 for forming the 3D pattern using electrojetting according to the third embodiment of the present invention, and FIGS. 18A and 18B are views of an example of a 3D pattern formed by the apparatus 300 for forming the 3D pattern using electrojetting according to the third embodiment of the present invention, in FIG. 17. As illustrated in FIGS. 18A and 18B, the 3D pattern is stacked on the substrate 350 in the three-dimensional manner. According to the embodiments of the present invention, the distance d between the syringe tip 320 and the substrate 350 may be adjusted to 10 µm by the movement unit 340. In this case, the polymer jet 110 may be sprayed from the syringe tip 320 and may be stacked on the substrate 350. The 3D pattern may be formed from the polymer jet 110 stacked on the substrate 350. An interval at which the 3D pattern is stacked, may be 50 µm, 10 µm, or 5 µm, for example.

Figure 19:
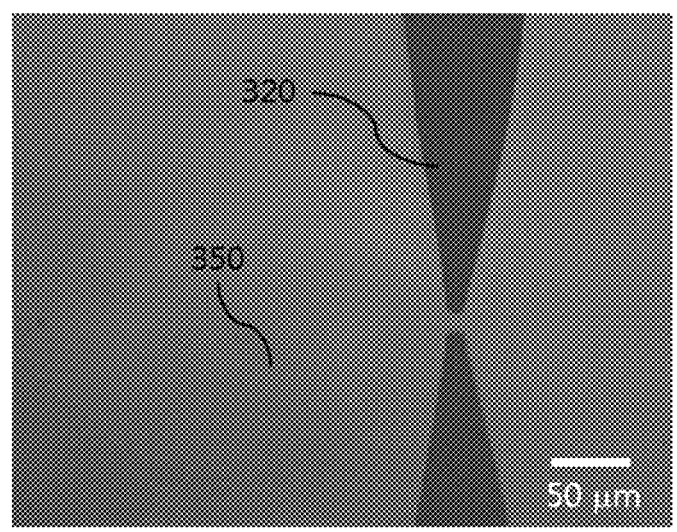
FIG. 19 is a view of a case where a distance between the syringe tip and the substrate is 5 μm, in the apparatus for forming the 3D pattern using electrojetting according to the third embodiment of the present invention.
Figure 20A:
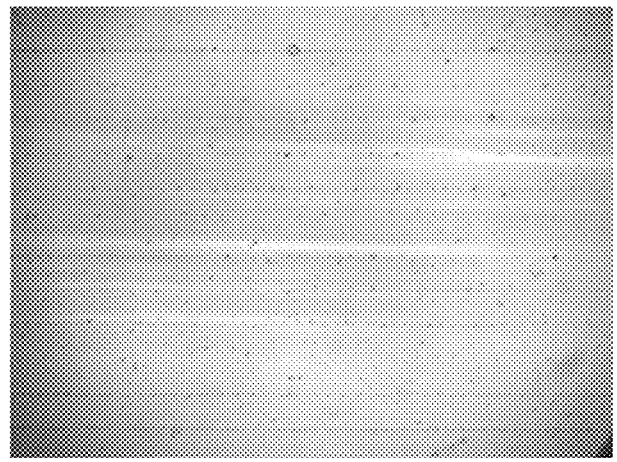
FIGS. 20A, 20B, and 20C are views of a 3D pattern formed by the apparatus for forming the 3D pattern using electrojetting according to the third embodiment of the present invention when a printing speed of a polymer jet is 0.1 mm/s, 0.3 mm/s, and 0.5 mm/s, respectively.
Figure 20B:
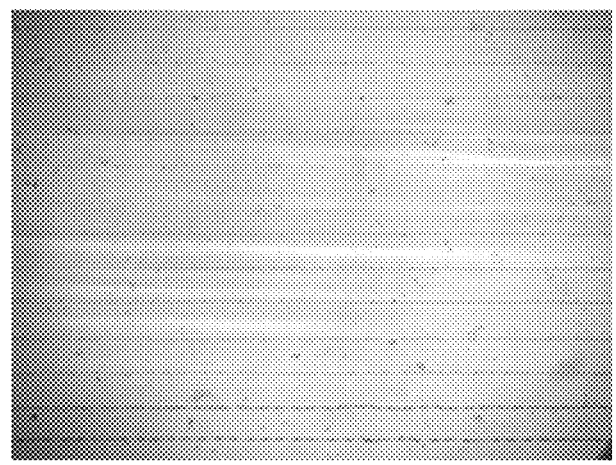
Figure 20C:
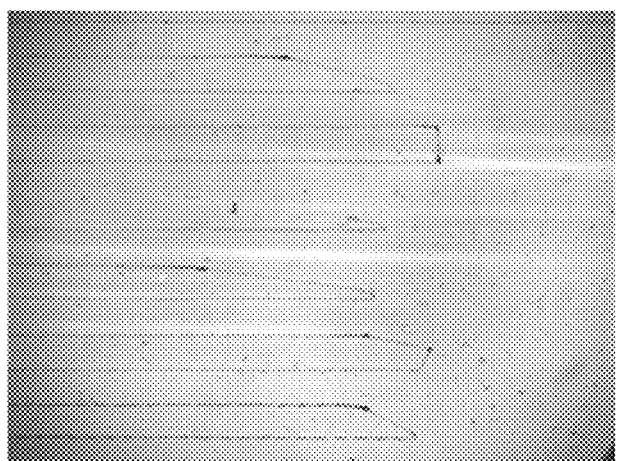
Figure 21:
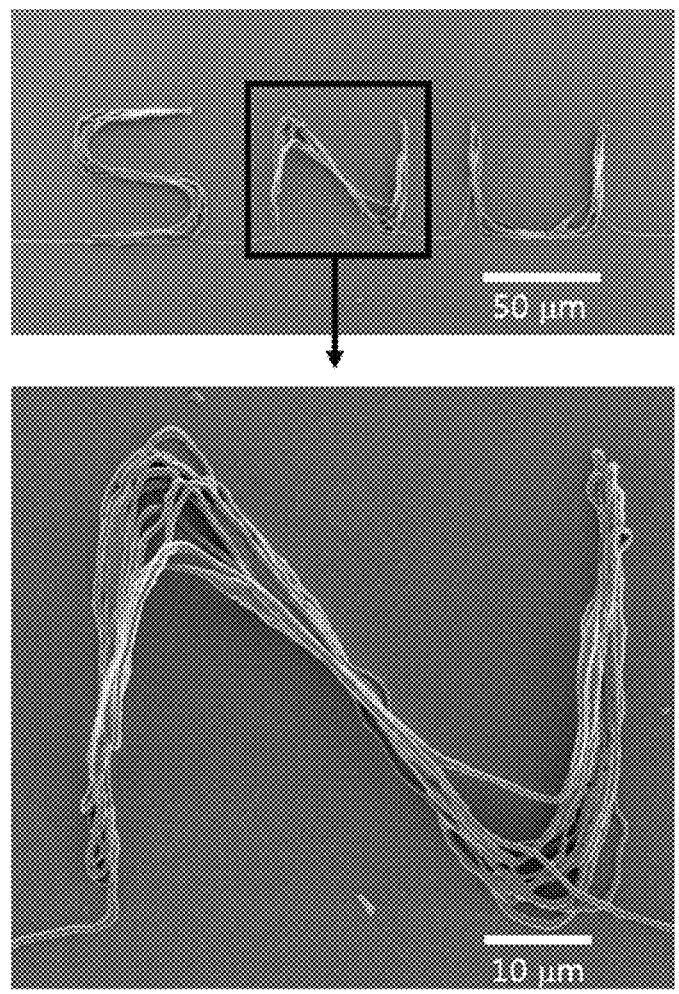
FIG. 21 is a view of another example of a 3D pattern formed by the apparatus for forming the 3D pattern using electrojetting according to the third embodiment of the present invention when a printing speed of the polymer jet is 0.1 mm/s.

FIG. 19 is a view of a case where the distance d between the syringe tip 320 and the substrate 350 is 5 µm, in the apparatus 300 for forming the 3D pattern using electrojetting according to the third embodiment of the present invention, and FIGS. 20A, 20B, and 20C are views of a 3D pattern formed by the apparatus 300 for forming the 3D pattern using electrojetting according to the third embodiment of the present invention when a printing speed of the polymer jet 110 is 0.1 mm/s, 0.3 mm/s, and 0.5 mm/s, respectively, and FIG. 21 is a view of another example of a 3D pattern formed by the apparatus 300 for forming the 3D pattern using electrojetting according to the third embodiment of the present invention when a printing speed of the polymer jet is 0.1 mm/s. As illustrated in FIGS. 20A, 20B, 20C, and FIG. 21, the 3D pattern is stacked on the substrate 350 in a three-dimensional manner. According to the embodiments of the present invention, the distance d between the syringe tip 320 and the substrate 350 may be adjusted to 5 µm by the movement unit 340. In this case, the polymer jet 110 may be sprayed from the syringe tip 320 and may be stacked on the substrate 350. The 3D pattern may be formed from the polymer jet 110 stacked on the substrate 350.

FIGS. 20A, 20B, and 20C are views of a 3D pattern formed by the apparatus 300 for forming the 3D pattern using electrojetting according to the third embodiment of the present invention when a printing speed of the polymer jet 110 is 0.1 mm/s, 0.3 mm/s, and 0.5 mm/s, respectively. As illustrated in FIGS. 20A, 20B, and 20C, even when the printing speed of the polymer jet 110 continuously changes into 0.1 mm/s, 0.3 mm/s, and 0.5 mm/s, a polymer fiber having a straight line shape is printed at a constant level. That is, according to the embodiments of the present invention, the polymer jet 110 may be discharged at a desired speed so that the 3D pattern may be formed on the substrate 350.

Figure 22:
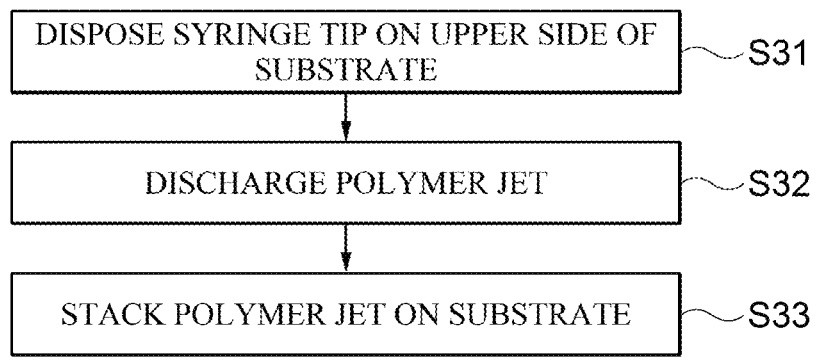
FIG. 22 is a flowchart illustrating a method for forming a 3D pattern using electrojetting according to a third embodiment of the present invention.

FIG. 22 is a flowchart illustrating a method for forming a 3D pattern using electrojetting according to a third embodiment of the present invention.

First, the syringe tip 320 is disposed on an upper side of the substrate 350 so that the distance d between the syringe tip 320 and the substrate 350 is greater than 0 or is equal to or less than 200 µm (Operation S31). In this state, when a voltage is applied to the syringe tip 320 or the substrate 350, an electrical attraction is applied to a polymer solution in the connection tube 324 toward the syringe tip 320 so that the polymer jet 110 may be discharged from the syringe tip 320 (Operation S32). Since the distance d between the syringe tip 320 and the substrate 350 is equal to or less than 200 µm (or 10 to 50 µm), when a negative (−) voltage is applied to the substrate 350, a positive (+) voltage less than about 0.05 kV is induced onto the syringe tip 320 so that an electric field may be formed between the syringe tip 320 and the substrate 350. In this case, the syringe tip 320 may function as an anode (+), and the substrate 350 may function as a cathode (−). Polymer particles in the syringe tip 320 have a self repulsive force due to being positive charged and simultaneously may be discharged onto the substrate 350 in good order due to electrical attraction with negative charges charged on the substrate 350.

Next, the movement unit 340 horizontally or vertically moves the syringe tip 320 or the substrate 350 in the 3D space so that the polymer jet 110 discharged from the syringe tip 320 may be moved relative to the upper side of the substrate 350 and may be stacked on the substrate 350 (Operation S33). The polymer jet 110 is stacked on the substrate 350 so that the 3D pattern may be formed.

As described above, in an apparatus and method for forming a 3D pattern using electrojetting according to the present invention, instability inherent in electrospinning of a polymer jet can be overcome, and instability of whipping of the polymer jet can be suppressed and simultaneously, the polymer jet can be self-stacked, and the 3D pattern can be stably formed.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An apparatus for forming a three-dimensional (3D) pattern using electrojetting, comprising:
   a syringe tip including one end from which a polymer jet is discharged;
   a substrate that is disposed in a direction in which the polymer jet is discharged, and that forms an electric field between the substrate and the syringe tip; and
   a movement unit that moves the syringe tip or the substrate,
   wherein the polymer jet discharged from the syringe tip is moved relative to an upper side of the substrate in a horizontal direction and is stacked on the substrate,
   wherein a distance between the syringe tip and the substrate is greater than 0 and is equal to or less than 200 µm,
   wherein the movement unit vertically moves the syringe tip in an opposite direction to the direction in which the polymer jet is discharged or vertically moves the substrate in the direction in which the polymer jet is discharged so that a distance between the syringe tip and the polymer jet stacked on the substrate is maintained at a constant level whenever the polymer jet is stacked on the substrate.

2. The apparatus of claim 1, further comprising a voltage supplier that applies a voltage having a certain polarity to the substrate so that the substrate functions with an opposite polarity to that of the syringe tip.

3. The apparatus of claim 2, wherein the voltage supplier controls a magnitude of the voltage applied to the substrate to be 0 or equal to or less than 0.2 kV so that the polymer jet is not discharged from the syringe tip.

4. The apparatus of claim 1, wherein the movement unit vertically moves the syringe tip in an opposite direction to the discharge direction or vertically moves the substrate in the discharge direction so that the polymer jet is not discharged from the syringe tip.

5. The apparatus of claim 1, wherein an inner diameter of the syringe tip is greater than 0 and is equal to or less than 200 μm.

6. The apparatus of claim 1, further comprising an electrode plate formed on the substrate, wherein the electrode plate comprises a first electrode plate, a second electrode plate, and a third electrode plate which is connected to the first electrode plate and the second electrode plate, onto which the polymer jet is adhered and on which a 3D pattern is formed.

7. The apparatus of claim 6, wherein the movement unit moves the syringe tip or the substrate so that a relative movement of the syringe tip between the first electrode plate, the second electrode plate, and the third electrode plate is performed.

8. The apparatus of claim 7, wherein the third electrode plate has a longitudinal shape or a waveform shape.

9. The apparatus of claim 8, wherein the movement unit moves the syringe tip or the substrate so that the syringe tip is moved relative to an upper side of a pattern formation portion disposed on an upper portion of the third electrode plate for the polymer jet to be adhered on.

10. The apparatus of claim 9, wherein the 3D pattern is formed in such a way that the polymer jet discharged from the syringe tip is stacked on the pattern formation portion in the longitudinal direction as the movement unit makes a reciprocal motion of the syringe tip or the substrate in a longitudinal direction of the third electrode plate.

11. The apparatus of claim 9, wherein the discharge direction of the polymer jet and a direction in which the syringe tip or the substrate is moved, are perpendicular to each other.

12. The apparatus of claim 7, wherein the third electrode plate comprises an annular portion having a circular band shape, and 3D circular walls are formed by the discharged polymer jet being rotated along and stacked on the annular portion.

13. The apparatus of claim 12, wherein the third electrode plate further comprises connection portions that connects the annular portion with the first electrode plate and the second electrode plate respectively, and a width of the circular band of the annular portion is greater than that of the connection portions.

* * * * *